(12) United States Patent
Komatsu et al.

(10) Patent No.: US 7,999,997 B2
(45) Date of Patent: Aug. 16, 2011

(54) ELECTROPHORETIC DISPLAY DEVICE, METHOD OF MANUFACTURING ELECTROPHORETIC DISPLAY DEVICE, AND ELECTRONIC DEVICE

(75) Inventors: Harunobu Komatsu, Matsumoto (JP); Hitoshi Yamamoto, Chino (JP); Akira Masumoto, Chino (JP); Mitsuo Kushino, Kawabe-gun (JP); Tomoyuki Kuwamoto, Nara (JP); Teruki Matsushita, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 255 days.

(21) Appl. No.: 12/379,304

(22) Filed: Feb. 18, 2009

(65) Prior Publication Data

US 2009/0207477 A1 Aug. 20, 2009

(30) Foreign Application Priority Data

Feb. 20, 2008 (JP) .................................. 2008-039183

(51) Int. Cl.
*G02B 26/00* (2006.01)
*G09G 3/34* (2006.01)

(52) U.S. Cl. ......... 359/296; 345/107; 345/204; 428/323

(58) Field of Classification Search ................... 359/296; 345/55, 76, 84, 89, 107, 108, 204, 211; 156/276
See application file for complete search history.

(56) References Cited

U.S. PATENT DOCUMENTS

| | | | |
|---|---|---|---|
| 7,050,218 B2 * | 5/2006 | Kanbe | 359/296 |
| 7,193,770 B2 | 3/2007 | Kanbe | |
| 7,292,386 B2 * | 11/2007 | Kanbe | 359/296 |
| 7,301,524 B2 * | 11/2007 | Kawai | 345/107 |
| 7,307,780 B2 | 12/2007 | Kanbe | |
| 7,457,028 B2 * | 11/2008 | Kanbe | 359/296 |
| 7,576,903 B2 * | 8/2009 | Yamamoto et al. | 359/296 |
| 7,660,032 B2 * | 2/2010 | Kanbe | 359/296 |
| 7,719,757 B2 * | 5/2010 | Kanbe | 359/296 |
| 2007/0121194 A1 | 5/2007 | Kanbe | |
| 2009/0208730 A1 * | 8/2009 | Komatsu et al. | 428/323 |

FOREIGN PATENT DOCUMENTS

| | | |
|---|---|---|
| JP | A-2003-322879 | 11/2003 |
| JP | A-2004-157237 | 6/2004 |
| JP | A-2005-24864 | 1/2005 |
| JP | A-2005-70369 | 3/2005 |
| JP | A-2006-030471 | 2/2006 |
| JP | A-2006-106452 | 4/2006 |
| JP | A-2006-259706 | 9/2006 |
| JP | A-2007-058151 | 3/2007 |
| JP | A-2007-133109 | 5/2007 |
| JP | A-2007-219185 | 8/2007 |

\* cited by examiner

*Primary Examiner* — Loha Ben
(74) *Attorney, Agent, or Firm* — Oliff & Berridge, PLC

(57) ABSTRACT

An electrophoretic display device is provided. The electrophoretic display device comprises a first electrode provided on a surface of a first base member; second electrodes provided on a surface of a second base member so that the second electrodes are placed in a facing relationship with the first electrode; and a plurality of microcapsules provided between the first electrode and the second electrodes, the plurality of microcapsules each having an internal space filled with an electrophoretic dispersion liquid, and the electrophoretic dispersion liquid containing electrophoretic particles. The electrophoretic display device is configured so that spaces are formed between the adjacent microcapsules and between the first electrode and the second electrodes. The electrophoretic display device can exhibit superior display performance and can be driven with a low voltage and reduced electricity consumption. A method of manufacturing an electrophoretic display device and an electronic device are also provided.

19 Claims, 8 Drawing Sheets

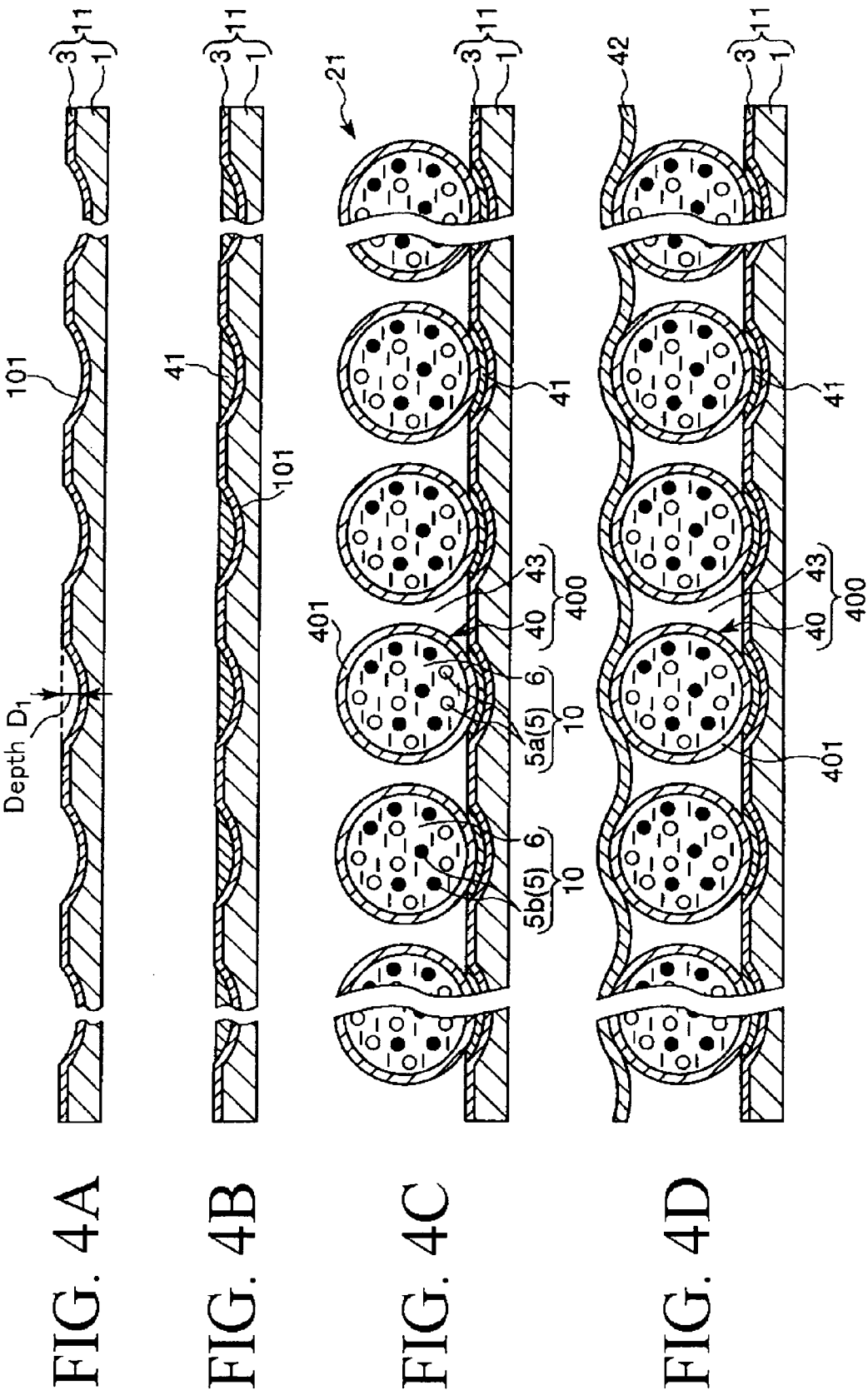

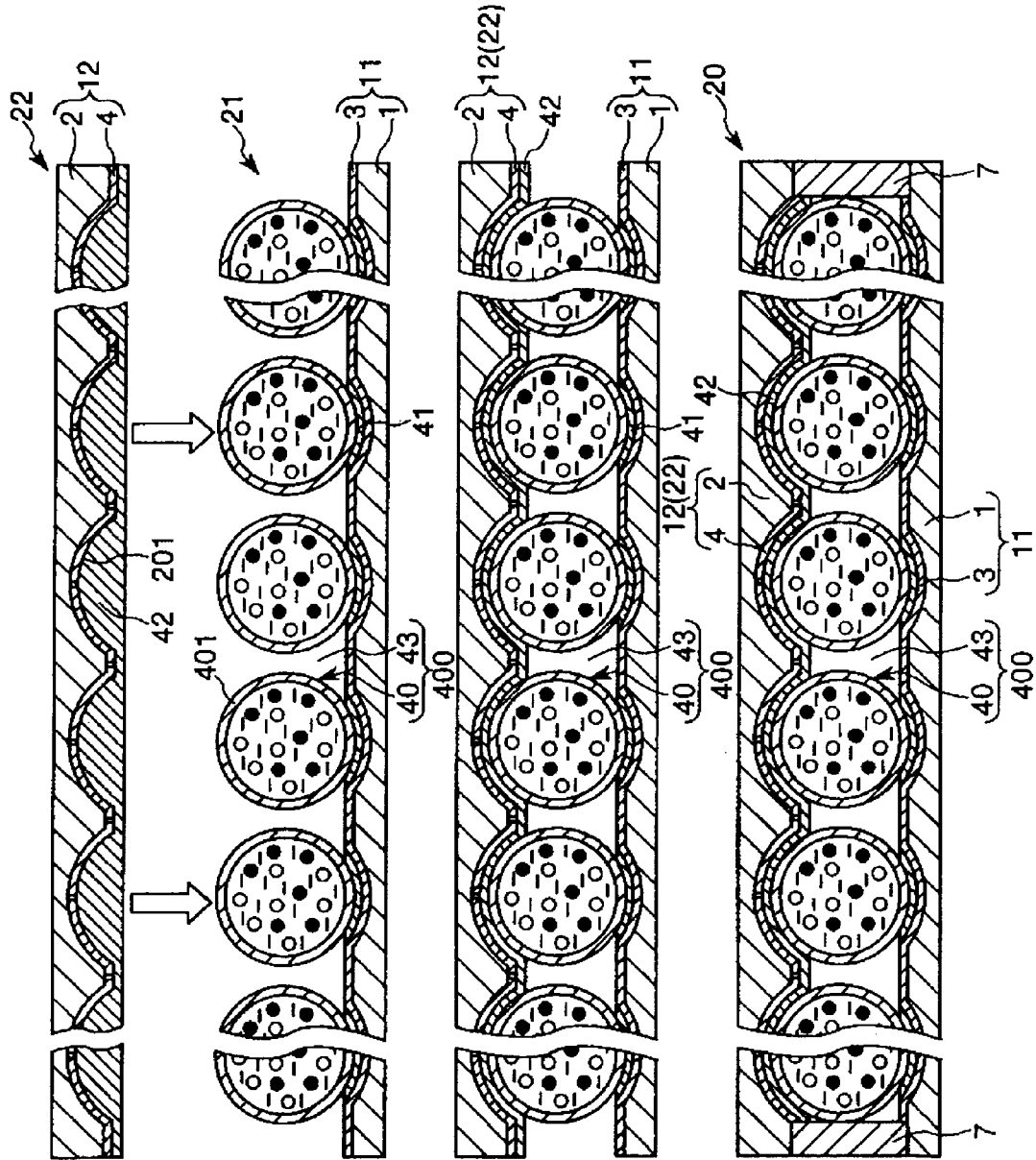

ELECTROPHORETIC DISPLAY DEVICE, METHOD OF MANUFACTURING ELECTROPHORETIC DISPLAY DEVICE, AND ELECTRONIC DEVICE

CROSS-REFERENCE TO RELATED APPLICATION

This application claims a priority to Japanese Patent Application No. 2008-039183 filed on Feb. 20, 2008 which is hereby expressly incorporated by reference herein in its entirety.

BACKGROUND

1. Technical Field

Several aspects of the present invention relate to an electrophoretic display device, a method of manufacturing an electrophoretic display device and an electronic device, and more specifically relates to an electrophoretic display device, a method of manufacturing the electrophoretic display device, and an electronic device provided with the electrophoretic display device.

2. Related Art

It is generally known that, if electric fields are allowed to act on a dispersion system in which fine particles are dispersed in liquid, the fine particles move (or migrate) in the liquid by the Coulomb force. This phenomenon is referred to as electrophoresis. In recent years, an electrophoretic display device that displays desired information (images) using the electrophoresis draws attention as a new display device.

The electrophoretic display device is characterized by exhibiting display memory characteristics and broad viewing angle characteristics even at the time of stoppage of voltage application and by possessing a capability of performing high contrast display with reduced electricity consumption.

An electrophoretic display device is a non-luminous type (reflection type) display device. Therefore, the electrophoretic display device has characteristic that scarcely damage eyes as compared to a luminous type display device such as a cathode-ray tube display.

As such an electrophoretic display device, there is known a microcapsule-type electrophoretic display device that includes a pair of substrates each having an electrode, and a plurality of microcapsules arranged between the substrates and filled with a dispersion system in which electrophoretic particles (fine particles) are dispersed in a dispersion medium (JP A-2007-58151 is an example of the related art).

In the meanwhile, in principle, an electrophoretic display device is characterized by its reduced electricity consumption characteristic as described above. On the other hand, however, a phenomenon that leak current flows between electrodes is likely to occur. When such a phenomenon occurs, electric power is consumed due to the leak current. Therefore, there is a problem that electricity consumption increases.

That is to say, in the case where a voltage V to be applied to between the electrodes is constant, electricity consumption P of the electrophoretic display device is inversely proportional to resistance values R between the electrodes as represented by the following relation: $P=V^2/R$.

Therefore, in a conventional electrophoretic display device, insulation property between electrodes is ensured by a binder having insulation property which is filled in spaces between the electrodes. However, metal ions and the like, which can not be removed from the binder, are contained in the binder.

Therefore, resistance values R of the binder are decreased due to the metal ions, so that there is a problem that electricity consumption P of the conventional electrophoretic display device is extremely increased.

Further, in order to suppress the electricity consumption P of the conventional electrophoretic display device from being increased, it may be conceived that a voltage V to be applied to between the electrodes is lowered. In this case, however, electric fields having sufficient intensity can not act on electrophoretic particles sufficiently so that it is impossible to move electrophoretic particles.

SUMMARY

It is an object of the present invention to provide an electrophoretic display device that can exhibit superior display performance and that can be driven with a low voltage and reduced electricity consumption since leak current between electrodes is suppressed in a low level.

Further, it is another object of the present invention to provide a manufacturing method that can manufacture the electrophoretic display device efficiently, and an electronic device provided with the electrophoretic display device having high reliability.

These objects are achieved by the present invention described below.

In a first aspect of the present invention, there is provided an electrophoretic display device. The electrophoretic display device comprises a first electrode provided on a surface of a first base member; second electrodes provided on a surface of a second base member so that the second electrodes are placed in a facing relationship with the first electrode; and a plurality of microcapsules provided between the first electrode and the second electrodes, the plurality of microcapsules each having an internal space filled with an electrophoretic dispersion liquid, and the electrophoretic dispersion liquid containing electrophoretic particles.

The electrophoretic display device is configured so that spaces are formed between the adjacent microcapsules and between the first electrode and the second electrodes.

According to the electrophoretic display device described above, since leak current between the first electrode and each of the second electrodes is suppressed in a low level, it is possible to obtain an electrophoretic display device that can exhibit superior display performance and that can be driven with a low voltage and reduced electricity consumption.

In the electrophoretic display device according to the present invention, it is preferred that when a volume-average particle size of the plurality of microcapsules is defined as "d", an average size of the spaces in a thickness direction of the electrophoretic display device is in the range of 0.2 d to 0.8 d.

According to the electrophoretic display device described above, it is possible to sufficiently suppress leak current without lowering display performance.

In the electrophoretic display device according to the present invention, it is also preferred that a volume-average particle size of the plurality of microcapsules is in the range of 20 to 60 μm.

According to the electrophoretic display device described above, the plurality of microcapsules become hard, and thus the manufactured electrophoretic display device can have improved display characteristics.

In the electrophoretic display device according to the present invention, it is also preferred that the plurality of microcapsules are arranged in a monolayer in a side by side relation without overlapping in a thickness direction of the electrophoretic display device.

According to the electrophoretic display device described above, it is possible to reliably allow electric fields to act on the plurality of microcapsules as compared to an electrophoretic display device including a plurality of layers of microcapsules which are overlapped with each other in a thickness direction of the electrophoretic display device.

Therefore, it is possible to reliably control movement of electrophoretic particles in the plurality of microcapsules so that it is possible to improve display contrast.

In the electrophoretic display device according to the present invention, it is also preferred that the surface of the first base member is formed with a plurality of concave portions in which the first electrode is disposed, and the surface of the second member is formed with a plurality of concave portions which respectively correspond to the concave portions of the first base member to form a plurality of pairs of corresponding concave portions, the second electrodes being respectively disposed in the concave portions of the second base member.

The plurality of microcapsules are provided between the first electrode and the second electrodes in a state that each microcapsule is partially received in each of the pairs of corresponding concave portions of the first and second base members.

According to the electrophoretic display device described above, it is possible to increase an effective area of a surface of each of the first electrode and the second electrodes which can allow electric fields to act on the plurality of microcapsules.

As a result, a region in which the electrophoretic particles can be moved increases inside each of the plurality of microcapsules so that the electrophoretic display device can exhibit superior display performance such as contrast.

Further, it is also possible to reliably control positions of the plurality of microcapsules in a microcapsule-containing layer (between the first electrode and the second electrodes). Therefore, it is possible to reliably prevent the plurality of microcapsules from being ununiformly arranged in the microcapsule-containing layer.

In the electrophoretic display device according to the present invention, it is also preferred that when a volume-average particle size of the plurality of microcapsules is defined as "d", the depth of each of the concave portions of the first and second base members is in the range of 0.1 d to 0.5 d.

According to the electrophoretic display device described above, it is possible to sufficiently ensure the effective area of the surface of each of the first electrode and the second electrodes which can allow the electric fields to act on each of the plurality of microcapsules.

Further, it is also possible to sufficiently ensure gaps S between the second electrodes and the first electrode. As a result, the electrophoretic display device can reliably prevent the current flowing between the first electrode and each of the second electrodes from being leaked. For these reasons, the manufactured electrophoretic display device can exhibit superior display characteristics with reduced electricity consumption.

In the electrophoretic display device according to the present invention, it is also preferred that the concave portions of the first and second base members include adjacent concave portions, a pitch between the adjacent concave portions is set so as to be larger than a volume-average particle size of the plurality of microcapsules.

According to the electrophoretic display device described above, the plurality of microcapsules are fixed to each of the concave portions in a spaced-apart state so as not to be brought into contact with each other. As a result, it is possible to reliably form spaces between the adjacent microcapsules, thereby reliably suppressing the leak current between the first electrode and each of the second electrodes.

In the electrophoretic display device according to the present invention, it is also preferred that the electrophoretic display device further comprises a first binder layer formed on the first electrode and a second binder layer formed on the second electrodes.

The plurality of microcapsules are fixed onto the first electrode through the first binder layer and onto the second electrodes through the second binder layer, and the first binder layer is provided on the first electrode so as not to be brought into contact with the second binder layer.

This makes it possible to reliably apply the electric fields from the first electrode to the plurality of microcapsules.

In the electrophoretic display device according to the present invention, it is also preferred that each of the first binder layer and the second binder layer has conductive property.

This makes it possible to reliably allow the electric fields from the first electrode to act on the plurality of microcapsules.

In the electrophoretic display device according to the present invention, it is also preferred that an electric conductivity of each of the first binder layer and the second binder layer is in the range of 20 to 200 µS/cm.

According to the electrophoretic display device described above, it is possible to suppress electric loss in each of the first binder layer and the second binder layer, thereby allowing the electric fields to act on the plurality of microcapsules efficiently.

Further, since parasitic capacity of each of the first binder layer and the second binder layer is reduced, it is possible to suppress a time delay of applying the electric fields to the plurality of microcapsules. Furthermore, it is also possible to suppress an involuntary voltage from being applied to the adjacent microcapsules.

In the electrophoretic display device according to the present invention, it is also preferred that each of the first binder layer and the second binder layer is constituted of an acryl-based resin as a main component thereof.

According to the electrophoretic display device described above, each of the first binder layer and the second binder layer can exhibit superior translucency so that display characteristics of the electrophoretic display device are improved.

In the electrophoretic display device according to the present invention, it is also preferred that each of the plurality of microcapsules has a substantially spherical shape.

According to the electrophoretic display device described above, even if compressive force is applied to the plurality of microcapsules, the plurality of microcapsules have sufficient pressure resistance and bleed resistance. Therefore, the electrophoretic display device can stably operate for a long period of time.

In a second aspect of the present invention, there is provided a method of manufacturing an electrophoretic display device. The method comprises preparing a first electrode provided on a first base member, and the first electrode having a surface; preparing second electrodes provided on a second base member; forming a first binder layer on the surface of the first electrode; supplying a plurality of microcapsules onto the first binder layer with a predetermined spacing between the adjacent microcapsules, the plurality of microcapsules each having an internal space, the internal space filled with an electrophoretic dispersion liquid, and the electrophoretic dispersion liquid containing electrophoretic particles; fixing the plurality of microcapsules onto the surface of the first electrode through the first binder layer to obtain an electrophoretic display sheet; forming a second binder layer on the plurality of microcapsules so as not to be brought into contact with the first binder layer to form spaces between the plurality of adjacent microcapsules and between the first binder layer and the second binder layer; and providing the second electrodes provided on the second base member on the second binder layer to obtain the electrophoretic display device.

According to the method described above, it is possible to efficiently manufacture an electrophoretic display device that can exhibit superior display performance and that can be driven with a low voltage and reduced electricity consumption.

In a third aspect of the present invention, there is provided a method of manufacturing an electrophoretic display device. The method comprises: preparing a first electrode provided on a first base member, and the first electrode having a surface; preparing second electrodes provided on a second base member; forming a first binder layer on the surface of the first electrode; supplying a plurality of microcapsules onto the first binder layer with a predetermined spacing between the adjacent microcapsules, the plurality of microcapsules each having an internal space, the internal space filled with an electrophoretic dispersion liquid, and the electrophoretic dispersion liquid containing electrophoretic particles; fixing the plurality of microcapsules onto the surface of the first electrode through the first binder layer to obtain an electrophoretic display sheet; forming a second binder layer preliminarily on the second electrodes provided on the second base member; and providing the second binder layer formed on the second electrodes on the plurality of microcapsules of the electrophoretic display sheet so as to allow the second binder layer to adhere to the plurality of microcapsules so that spaces are formed between the plurality of adjacent microcapsules and between the first binder layer and the second binder layer to obtain the electrophoretic display device.

According to the method described above, it is possible to efficiently manufacture an electrophoretic display device that can exhibit superior display performance and that can be driven with a low voltage and reduced electricity consumption.

In the method according to the present invention, it is preferred that the second base member has a surface on which the second electrodes are formed and a plurality of concave portions are provided on the surfaces thereof, and the second electrodes are formed on the surface of the second base member so that the second electrodes are respectively disposed in the concave portions of the second base member, wherein the second binder layer is formed on the second electrodes so as to be in contact with the second electrodes disposed in the concave portions of the second base member.

According to the method described above, the second binder layer is reliably bonded (adheres) to the second electrodes. Therefore, when the second binder layer provided on the second electrodes are provided on the plurality of microcapsules of the electrophoretic display sheet, even if the second binder layer faces in a vertical direction, it is possible to prevent the second binder layer from falling from the second electrodes to be brought into contact with the first binder layer. Therefore, it is possible to reliably form the spaces between the plurality of microcapsules.

In the method according to the present invention, it is also preferred that before the forming step of the second binder layer and after the fixing step of the plurality of microcapsules, the method further comprises tilting the electrophoretic display sheet.

According to the method described above, it is possible to remove improperly-sized microcapsules, which are not fixed to the first electrode, from the electrophoretic display sheet with ease.

In the method according to the present invention, it is also preferred that the supplying step of the plurality of microcapsules comprises: dispersing the plurality of microcapsules to a dispersion medium having a volatile property to obtain a microcapsule dispersion liquid; supplying the microcapsule dispersion liquid onto the first binder layer to obtain a liquid coating film; and volatilizing and removing the dispersion medium from the liquid coating film to thereby allow the plurality of microcapsules to remain on the first binder layer.

This makes it possible to easily arrange only the plurality of microcapsules on the first binder layer.

In the method according to the present invention, it is also preferred that a specific gravity of the dispersion medium is lower than a specific gravity of each of the plurality of microcapsules.

This makes it possible to rapidly settle down the plurality of microcapsules when the microcapsule dispersion liquid is supplied onto the first binder layer. Therefore, it is possible to efficiently arrange only the plurality of microcapsules on the first binder layer.

In a fourth aspect of the present invention, there is provided an electronic device provided with the electrophoretic display device described above.

This makes it possible to obtain an electronic device having high reliability.

In the electrophoretic display device according to the present invention, it is also preferred that the first binder layer includes sub-first binder layers, the sub-first binder layers are formed only in the concave portions of the first base member.

BRIEF DESCRIPTION OF THE DRAWINGS

FIGS. 4A to 4D are pattern diagrams for explaining a first embodiment of a method of manufacturing the electrophoretic display device according to the present invention.

FIGS. 6A to 6C are pattern diagrams for explaining a second embodiment of a method of manufacturing the electrophoretic display device according to the present invention.

DESCRIPTION OF EXEMPLARY EMBODIMENTS

Hereinafter, an electrophoretic display device, a method of manufacturing an electrophoretic display device, and an electronic device in accordance with the present invention will be described in detail with reference to preferred embodiments shown in the accompanying drawings.

Electrophoretic Display Device

First, a description will be made on an electrophoretic display device according to the present invention.

Figure 1:
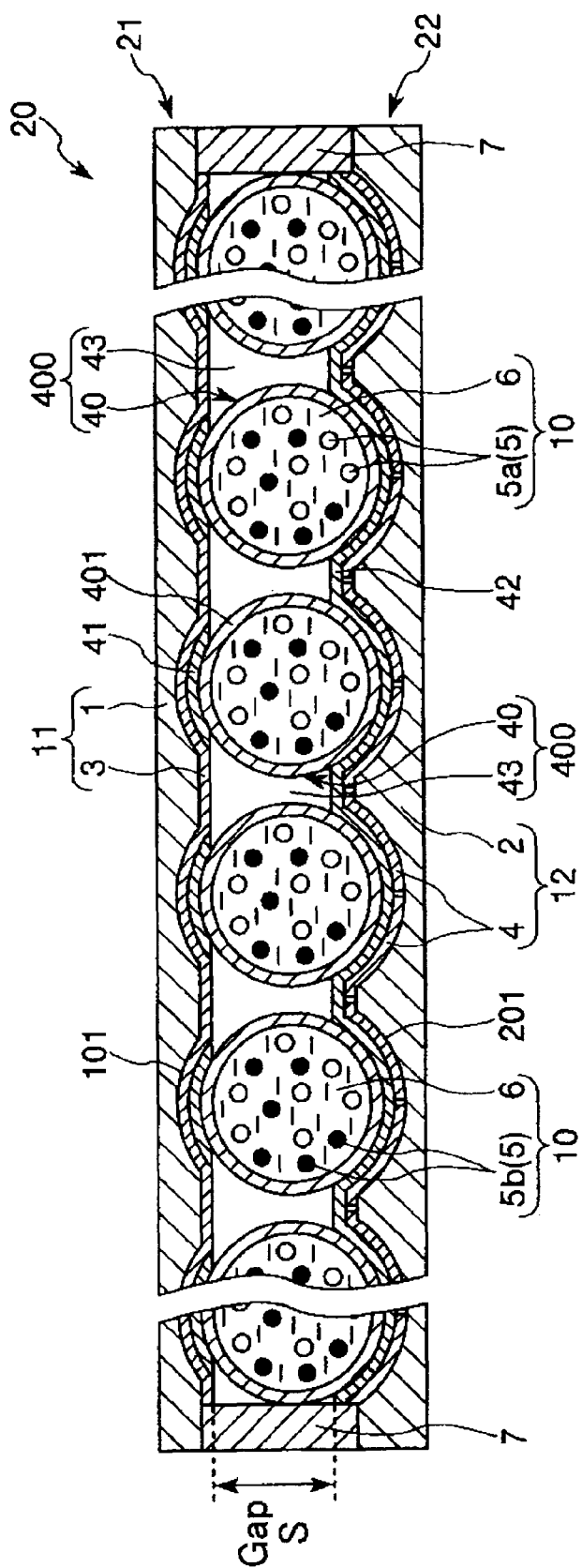
FIG. 1 is a pattern diagram showing a vertical section of an electrophoretic display device according to the present invention.

FIG. 1 is a pattern diagram showing a vertical section of the electrophoretic display device according to the present invention. Hereinafter, the upper side in FIG. 1 will be referred to as "upper" and the lower side will be referred to as "lower" for the purpose of convenience in the description.

The electrophoretic display device 20 shown in FIG. 1 includes an electrophoretic display sheet (a front plane) 21, a circuit board (a back plane) 22, and a sealing part 7 for air-tightly sealing a gap between the electrophoretic display sheet 21 and the circuit board 22.

The electrophoretic display sheet 21 includes a base substrate 11, which has a (first) base member 1 and a first electrode 3 formed on a lower surface of the base member 1, a plurality of microcapsules (hereinafter, simply referred to as "microcapsules") 40 arranged on a lower surface (one major surface) of the base substrate 11 (the first electrode 3), and first binder layers provided between each of the microcapsules 40 and the first electrode 3. These microcapsules 40 include an electrophoretic dispersion liquid 10 containing electrophoretic particles 5 in an internal space thereof.

Further, a plurality of concave portions (hereinafter, simply referred to as "concave portions") 101 are formed on the lower surface of the base member 1. The first electrode 3 described above is provided on the lower surface of the base member 1. In this way, the first electrode 3 is disposed in the concave portions 101.

On the other hand, the circuit board 22 includes an opposite substrate 12 which has a (second) base member 2 and a plurality of second electrodes (hereinafter, simply referred to as "second electrodes") 4 formed on an upper surface of the base member 2, and circuits (not shown) provided in the opposite substrate 12 (the base member 2), the circuits including switching elements such as TFTs and the like.

Further, a plurality of concave portions (hereinafter, simply referred to as "concave portions") 201 are formed on the upper surface of the base member 2. The second electrodes 4 described above are provided on the upper surface of the base member 2. In this way, the second electrodes 4 are disposed in the concave portions 201.

Furthermore, an upper portion of each of the microcapsules 40 enters into (are placed) the concave portions 101, respectively. On the other hand, a lower portion of each of the microcapsules 40 enters into (are placed) the concave portions 201, respectively.

Furthermore, there are spaces 43 between the microcapsules 40 and between the first electrode and the second electrodes.

In the electrophoretic display device 20 provided with such an electrophoretic display sheet 21 and such a circuit board 22, the electrophoretic particles 5 are moved by applying a voltage between the first electrode 3 and each of the second electrodes 4. This makes it possible to display desired information (image) on a display portion of the upper surface of the base substrate 11.

In the electrophoretic display device 20, the spaces 43 insulate between the first electrode 3 and the second electrodes 4. Therefore, it is possible to reliably prevent short circuit between the first electrode 3 and each of the second electrodes 4 due to metal ions contained in a binder used in a conventional electrophoretic display device, which may occur to the conventional electrophoretic display device.

As a result, it is possible to obtain an electrophoretic display device 20 that can exhibit superior display performance such as contrast and that can be driven with a low voltage and reduced electricity consumption.

Hereinafter, a construction of the respective parts will be now described one after another.

The base members 1 and 2 are formed from a sheet-like (plate-like) member and have a function of supporting or protecting the respective members arranged therebetween.

Although the base members 1 and 2 may be either flexible or rigid, it is preferred that the base members 1 and 2 have flexibility. Use of the base members 1 and 2 having flexibility makes it possible to provide a flexible electrophoretic display device 20, namely, an electrophoretic display device 20 useful in constructing, e.g., an electronic paper.

In the case where the base members 1 and 2 are flexible, examples of a constituent material thereof include polyolefin such as polyethylene, modified polyolefin, polyamide, thermoplastic polyimide, polyether, polyether ether ketone, various kinds of thermoplastic elastomers such as s polyurethane-based elastomer and a chlorinated polyethylene-based elastomer, copolymers mainly constituted of the above materials, blends mainly constituted of the above materials, polymer alloys mainly constituted of the above materials, and the like. One or more of these materials may be used independently or in combination.

An average thickness of each of the base members 1 and 2 is not particularly limited to a specific value, but may be arbitrarily set depending on the constituent material and use thereof.

In the case where the base members 1 and 2 are flexible, the average thickness of each of the base members 1 and 2 is preferably in the range of about 20 to 500 μm, and more preferably in the range of about 25 to 250 μm. This makes it possible to reduce the size (especially, the thickness) of the electrophoretic display device 20, while harmonizing flexibility and strength of the electrophoretic display device 20.

The first electrode 3 and the second electrodes 4 are of a layered shape (film shape) and are respectively formed on major surfaces of the base members 1 and 2 on the sides of a microcapsule-containing layer 400. In other words, the first electrode 3 is formed on the lower surface of the base member 1 and the second electrodes 4 are formed on the upper surface of the base member 2.

If a voltage is applied to between the first electrode 3 and the second electrodes 4, electric fields are generated across them so that the electric fields act on electrophoretic particles (display particles) 5.

In this embodiment, the first electrode 3 serves as a common electrode and the second electrodes 4 function as individual electrodes divided in a form of a matrix (pixel electrodes connected to the switching elements). A portion where the first electrode 3 is overlapped with one of the second electrodes 4 constitutes a unit pixel.

In this regard, the first electrode 3 may function as individual electrodes and the second electrodes 4 may serve as a common electrode. Just like the second electrodes 4, the first electrode 3 may be divided into a plurality of electrodes.

Furthermore, the first electrode 3 may be divided into a plurality of stripe-shaped electrodes and, similarly, the second electrodes 4 may be divided into a plurality of stripe-shaped electrodes. In this case, the first electrode 3 and the second electrodes 4 may be arranged to intersect with each other.

A constituent material of each of the first electrode 3 and the second electrodes 4 is not particularly limited to a specific type as long as it is substantially conductive. Various kinds of conductive materials may be used as the constituent material of each of the first electrode 3 and the second electrodes 4.

Examples of such a conductive material include: a metallic material such as copper, aluminum or alloy containing these metals; a carbon-based material such as carbon black; an electronically conductive polymer material such as polyacetylene, polyfluorene or derivatives thereof; an ion-conductive polymer material produced by dispersing an ionic substance such as NaCl or $Cu(CF_3SO_3)_2$ in a matrix resin such as polyvinyl alcohol or polycarbonate; and a conductive oxide material such as indium oxide (IO); and the like. One or more of these materials may be used independently or in combination.

An average thickness of each of the first electrode 3 and the second electrodes 4 is not particularly limited to a specific value, but may be arbitrarily set depending on the constituent material and use thereof. The average thickness of each of the first electrode 3 and the second electrodes 4 is preferably in the range of about 0.05 to 10 μm, and more preferably in the range of about 0.05 to 5 μm.

Among the base members 1 and 2 and the first electrode 3 and the second electrodes 4, the ones arranged on a display surface side (the base member 1 and the first electrode 3 in this embodiment) are optically transparent, i.e., substantially transparent (clear and colorless, clear and colorful, or translucent).

This makes it possible to easily recognize, through visual observation, a status of the electrophoretic particles 5 in the electrophoretic dispersion liquid 10 described below, i.e., information (images) displayed by the electrophoretic display device 20.

In the electrophoretic display sheet 21, a microcapsule-containing layer 400 is provided on the lower surface of the first electrode 3 and lower surfaces of first binder layers 41. The microcapsule-containing layer 400 includes the microcapsules 40 each having a capsule body (shell) 401 filled with (encapsulating) the electrophoretic dispersion liquid 10, and the spaces 43 which are spaces between the microcapsules 40.

Examples of a constituent material of the capsule body (shell) 401 include: gelatin; a composite material consisted of gum arabic and gelatin; and various kinds of resin material such as an urethane-based resin, a melamine-based resin, an urea-formaldehyde resin, polyamide, polyether or the like. One or more of these materials may be used independently or in combination.

Examples of the gelatin include: untreated gelatin; lime-treated gelatin; oxidation-treated gelatin; decalcified gelatin with reduced calcium content; and oxidation-treated gelatin having reduced methionine residues. One or more of them may be used independently or in combination.

The constituent material of the capsule body 401 may be cross-linked (three-dimensional cross-linked) by means of a cross-linking agent. This makes it possible to increase strength of the capsule body 401 while maintaining flexibility thereof. As a result, it is possible to prevent the microcapsules 40 from being broken with ease.

In this regard, it is to be noted that the capsule body 401 may have a monolayer structure, but a laminated structure in which a plurality of layers are formed by laminating. In this case, a constituent material of each of the layers may be an identical material or a different material each other.

The electrophoretic dispersion liquid 10 encapsulated within the capsule body 401 is produced by dispersing (or suspending) at least one kind of electrophoretic particles 5 (two kinds of electrophoretic particles 5, i.e., white particles 5*a* and colored particles 5*b* differing in color tone from the white particles 5*a*, in this embodiment) in a liquid-phase dispersion medium 6.

A task of dispersing the electrophoretic particles 5 in the liquid-phase dispersion medium 6 can be performed by using one or more of, e.g., a paint shaker method, a ball mill method, a media mill method, an ultrasonic dispersion method and a stirrer dispersion method.

A dispersion medium that exhibits low solubility to the capsule body 401 and has relatively high insulation performance is preferably used as the liquid-phase dispersion medium 6.

Examples of the liquid-phase dispersion medium 6 include: various kinds of water (e.g., distilled water, deionized water, ion-exchanged water and RO water); alcohol such as methanol, ethanol, isopropanol, butanol, octanol, ethylene glycol, diethylene glycol, glycerin and the like; cellosolve such as methyl cellosolve, ethyl cellosolve, phenyl cellosolve and the like; ester such as methyl acetate, ethyl acetate, butyl acetate, ethyl formate and the like; ketone such as acetone, methyl ethyl ketone, diethyl ketone, methyl isobutyl ketone, methyl isopropyl ketone, cyclohexanone and the like; aliphatic hydrocarbon (liquid paraffin) such as pentane, hexane, octane and the like; alicyclic hydrocarbon such as cyclohexane, methyl cyclohexane and the like; aromatic hydrocarbon including benzene with a long-chain alkyl group, such as benzene, toluene, xylene, hexyl benzene, heptyl benzene, octyl benzene, nonyl benzene, decyl benzene, undecyl benzene, dodecyl benzene, tridecyl benzene, tetradecyl benzene and the like; halogenated hydrocarbon such as methylene chloride, chloroform, carbon tetrachloride, 1,2-dichloroethane and the like; aromatic heterocycle such as pyridine, pyrazine, furan, pyrrole, thiophene, methyl pyrolidone and the like; nitrile such as acetonitrile, propionitrile, acrylonitrile and the like; amide such as N,N-dimethylformamide, N,N-dimethylacetamide and the like; carboxylic salt; and various kinds of oil. One or more of them may be used independently or in combination.

If necessary, various kinds of additive may be added to the liquid-phase dispersion medium 6 (electrophoretic dispersion liquid 10). Examples of such an additive include: a charge-controlling agent formed of particles of an electrolyte, a (anionic or cationic) surfactant, a metal soap, a resin material, a rubber material, a oil, a varnishe, compounds or the like; a dispersion agent such as a titanium-based coupling agent, an aluminum-based coupling agent, a silane-based coupling agent and the like; a lubricating agent; and a stabilizing agent.

Examples of such a surfactant include alkenyl succinate ester, alkenyl succinate polyimide, and the like.

Further, in the case where the liquid-phase dispersion medium 6 is colored, if necessary, a dye may be dissolved therein. Examples of the dye include various kinds of dye such as an anthraquinone-based dye, an azo-based dye, an indigoid-based dye, a triphenylmethane-based dye, a pyrazolone-based dye, a stilbene-based dye, a diphenylmethane-based dye, a xanthenes-based dye, an alizarine-based dye, an acridine-based dye, a quinonimine-based dye, a thiazole-based dye, a methine-based dye, a nitro-based dye, a nitros-based dye, and the like.

The electrophoretic particles 5 may be of any type as long as they are charged and can be electrophoretically moved in the liquid-phase dispersion medium 6 under the action of the electric fields. Although there is no particular limitation, at least one of pigment particles, resin particles and composite particles thereof may be preferably used as the electrophoretic particles 5. These kinds of particles provide advantages in that they can be manufactured with ease and can perform a charge-controlling task in a relatively easy manner.

Examples of a pigment of which pigment particles are made include: a black pigment such as aniline black, carbon black, titanium black, and the like; a white pigment such as titanium oxide, antimony oxide, barium sulfate, zinc sulfide, zinc oxide, silicon oxide, aluminum oxide and the like; an azo-based pigment such as monoazo, disazo, polyazo and the like; a yellow pigment such as isoindolinone, chrome yellow, yellow iron oxide, cadmium yellow, titanium yellow, antimony and the like; a red pigment such as quinacridone red, chrome vermilion and the like; a blue pigment such as phthalocyanine blue, indanthrene blue, iron blue, ultramarine blue, cobalt blue and the like; and a green pigment such as phthalocyanine green and the like. One or more of these pigments may be used independently or in combination.

Examples of a resin material of which resin particles are made include an acrylic-based resin, an urethane-based resin, an urea-based resin, an epoxy-based resin, polystyrene, polyester and the like. One or more of these resin materials may be used independently or in combination.

Examples of the composite particles include: particles produced by coating the surfaces of the pigment particles with the resin material or other pigment; particles produced by coating the surfaces of the resin particles with the pigment; and particles made of a mixture obtained by mixing the pigment and the resin material in a suitable composition ratio.

Examples of the particles produced by coating the surfaces of the pigment particles with other pigment include particles obtained by coating the surfaces of titanium oxide particles with silicon oxide or aluminum oxide. These particles are preferably used as the white particles 5a.

Carbon black particles or particles produced by coating the surfaces of the carbon black particles are preferably used as colored particles (black particles) 5b.

The shape of the electrophoretic particles 5 may preferably be, but is not particularly limited to a specific shape, a spherical shape.

An average particle size of the electrophoretic particles 5 is preferably in the range of about 10 to 500 nm and more preferably in the range of about 20 to 300 nm.

If the average particle size of the electrophoretic particles 5 falls within the above-noted range, the electrophoretic particles 5 have a suitable size. Therefore, it is possible to reliably prevent the electrophoretic particles 5 from clumping together or sinking in the liquid-phase dispersion medium 6. As a result, it becomes possible to prevent degradation in the display quality of the electrophoretic display device 20.

In the case where two different particles of different colors are used as in the present embodiment, it is preferred that they have different average particle sizes. It is particularly preferred that the average particle size of the white particles 5a is set greater than that of the colored particles 5b. This makes it possible to increase the display contrast and retention characteristics of the electrophoretic display device 20.

More specifically, it is preferred that the colored particles 5b have an average particle size in the range of about 20 to 100 nm and the white particles 5a have an average particle size in the range of about 150 to 300 nm.

It is also preferred that a specific gravity of the electrophoretic particles 5 is set almost equal to that of the liquid-phase dispersion medium 6. This ensures that the electrophoretic particles 5 can stay in specified positions within the liquid-phase dispersion medium 6 for a prolonged period of time, even after a voltage application to between the first electrode 3 and each of the second electrodes 4 is stopped.

That is to say, information displayed on the electrophoretic display device 20 is visibly retained for an extended period of time.

It is preferred that the microcapsules 40 have the substantially uniform size. This allows the electrophoretic display device 20 to exhibit superior display performance while avoiding or reducing occurrence of variations in display.

With the present invention, it is preferred that the microcapsules 40 are kept in a generally spherical shape.

With the present invention, the microcapsules 40 have strength great enough to keep the spherical shape between the second electrodes 4 and the first electrode 3 even when pressure is applied between the base substrate 11 and the opposite substrate 12. This makes it possible to increase pressure resistance and bleed resistance of the microcapsules 40, thereby ensuring that the electrophoretic display device 20 is stably operated for a long period of time.

The phrase "pressure resistance of the microcapsules 40" used herein refers to a property with which the microcapsules 40 resist the pressure applied thereto without being crushed. The phrase "bleed resistance of the microcapsules 40" used herein refers to a property with which the liquid dispersion medium 6 encapsulated into the microcapsules 40 is kept against dissipation to the outside.

As for a particle size of the capsule body 401, a volume-average particle size thereof is preferably in the range of about 20 to 60 μm, and more preferably in the range of about 30 to 50 μm. If the volume-average particle size of the capsule body 401 falls within such a range, the microcapsules 40 become hard and have high display characteristics.

Such microcapsules 40 are arranged in a monolayer in a side by side relation through the length and breadth of the microcapsule-containing layer 400. In other words, the microcapsules 40 are arranged one by one so as not to overlap with each other in a thickness direction of the electrophoretic display device 20.

This makes it possible to reliably allow the electric fields to act on the microcapsules 40 as compared to a case that a plurality layers of microcapsules are formed by overlapping the microcapsules 40 in a thickness direction of an electrophoretic display device. Therefore, movement of the electrophoretic particles 5 included in the microcapsules 40 can be reliably controlled so that it is possible to improve the display contrast.

As described above, the upper portion of each of the microcapsules 40 enters into the concave portions 101 which are formed on the lower surface of the base member 1, respectively. On the other hand, the lower portion of each of the microcapsules 40 enters into the concave portions 201 which are formed on the upper surface of the base member 2, respectively.

In this way, by allowing the upper portions of the microcapsules 40 to enter into the concave portions 101 and allowing the lower portions of the microcapsules 40 to enter into the concave portions 201, it is possible to increase effective areas of both the first electrode 3 and the second electrodes 4 which can allow the electric fields to act on the microcapsules 40.

As a result, a region in which the electrophoretic particles 5 can be moved increases inside each of the microcapsules 40 so that the electrophoretic display device 20 can exhibit superior display performance.

Further, by allowing the upper portions of the microcapsules 40 to enter into the concave portions 101 and allowing the lower portions of the microcapsules 40 to enter into the concave portions 201, it is possible to reliably control positions of the microcapsules 40 in the microcapsule-containing layer 400. Therefore, it is possible to reliably prevent the microcapsules 40 from being ununiformly arranged in the microcapsule-containing layer 400.

Furthermore, the upper portions of the microcapsules 40 are fixed to the concave portions 101 through the first binder layers 41 and the first electrode 3, respectively.

The first binder layers 41 are provided on the first electrode 3 provided in the concave portions 101 for the purpose of fixing the microcapsules 40 to the base substrate 11 and conducting the microcapsules 40 and the base substrate 11. Therefore, the electric fields can act on from the first electrode 3 to the microcapsules 40 fixed to the first binder layers 41.

Preferably used as the first binder layers 41 are a resin material that exhibits high affinity with (improved adhesion to) the first electrode 3 and the capsule bodies 401 (of the microcapsules 40) and exhibits increased conductivity performance.

This makes it possible to reliably allow the electric fields to act on the microcapsules 40 through the first binder layers 41.

Examples of a constituent material used as the first binder layers 41 include: various kinds of resin materials, a composite material obtained by dispersing conductive particles to the various kinds of resin materials, and the like. The various kinds of resin materials include an acryl-based resin, an olefin-based resin, an ABS resin, a vinyl chloride resin, a cellulose-based resin, a silicone-based resin, an urethane-based resin, and the like.

The conductive particles include: a metal material such as Au, Ag, Cu, Pt, and Ni; a conductive metal oxide material such as ITO, and FTO; a carbon-based material such as graphite; and the like.

Among these resin materials mentioned above, the first binder layers 41 are preferably constituted of the acryl-based resin as a main component thereof. Use of acryl-based resin makes it possible for the first binder layers 41 to exhibit superior translucency so that it is possible to improve display characteristics.

On the other hand, the lower portions of the microcapsules 40 are fixed to the concave portions 201 through the second binder layer 42 and the second electrodes 4, respectively.

Preferably used as the second binder layer 42 is a resin material that exhibits high affinity with (improved adhesion to) the second electrodes 4 and the capsule bodies 401 (of the microcapsules 40) and exhibits increased conductivity performance.

This makes it possible to reliably allow the electric fields to act on the microcapsules 40 through the second binder layer 42.

A constituent material of such a second binder layer 42 can use the same material as those of the first binder layers 41 described above.

When the volume-average particle size of the microcapsules 40 is defined as "d", each of the depth $D_2$ of each of the concave portions 201 is preferably in the range of about 0.1 d to 0.5 d, and more preferably in the range of about 0.12 d to 0.3 d, though may be arbitrarily set depending on the particle size of each of the microcapsules 40.

Further, when the volume-average particle size of the microcapsules 40 is defined as "d", each of the depth $D_1$ of each of the concave portions 101 is preferably in the range of about 0.1 d to 0.5 d, and more preferably in the range of about 0.12 d to 0.3 d, though may be arbitrarily set depending on the particle size of each of the microcapsules 40.

By setting the depth $D_2$ of each of the concave portions 201 within above noted range, it is possible to sufficiently ensure the effective area of the surface of each of the second electrodes 4 which can allow the electric fields to act on each of the microcapsules 40.

By setting the depth $D_1$ of each of the concave portions 101 within above noted range, it is possible to sufficiently ensure the effective area of the surface of the first electrode 3 which can allow the electric fields to act on each of the microcapsules 40.

Further, it is also possible to sufficiently ensure a gap S between the first electrode 3 and the second binder layer 42. As a result, the electrophoretic display device 20 can reliably prevent the current flowing between the first electrode 3 and each of the second electrodes 4 from being leaked. For these reasons, the manufactured electrophoretic display device 20 can exhibit superior display characteristics with reduced electricity consumption.

If the depth $D_1$ of each of the concave portions 101 is smaller than the lower limit value noted above, the lower surface area of the first electrode 3 is decreased. In other words, the surface area of each of the concave portions 101 is decreased.

Further, if the depth $D_2$ of each of the concave portions 201 is smaller than the lower limit value noted above, the upper surface area of each of second electrodes 4 is decreased. In other words, the surface area of each of the concave portions 201 is decreased.

Therefore, since the microcapsules 40 bring into contact with each of the concave portions 101 and 201 by small contact areas, respectively, the electric fields can act on only small areas of the microcapsules 40. As a result, there is a fear that display characteristics (contrast and the like) are lowered.

On the other hand, if the depth $D_1$ of each of the concave portions 101 or the depth $D_2$ of each of the concave portions 201 exceeds the upper limit value noted above, a gap S between the second binder layer 42 and each of the first binder layers 41 become materially long. As a result, there is a fear that leak current between the first electrode 3 and each of the second electrodes 4 is increased materially.

Further, it is preferred that the depth $D_1$ of each of the concave portions 101 and the depth $D_2$ of each of the concave portions 201 are different from each other. This makes it possible to reliably fix the microcapsules 40 to concave portions of which either of the concave portions 101 and the concave portions 201 is deeper, that is, deep concave portions.

On the other hand, due to shallow concave portions which opposites the deep concave portions (either of the concave portions 101 and the concave portions 201 is shallower), the gap S between the second binder layer 42 and each of the first binder layers 41 can be set so as not to become materially short.

In this regard, the depth $D_2$ of each of the concave portions 201 is deeper than the depth $D_1$ of each of the concave portions 101 in this embodiment.

A thickness of the second binder layer 42 which fixes the microcapsules 40 to the concave portions 201 is larger than that of each of the first binder layers 41 which fix the microcapsules 40 to the concave portions 101. Even if a particle size of the microcapsules 40 is ununiform, the second binder layer 42 can compensate for it.

Therefore, a voltage can be applied to all of the microcapsules 40. As a result, the second binder layer 42 can be reliably brought into contact with the microcapsules 40 having the ununiform particle size.

Furthermore, the electrophoretic display device 20 according to this embodiment displays images by utilizing light of transmitting the first binder layers 41. Therefore, when the thickness of each of the first binder layers 41 is thinner than the thickness of the second binder layer 42, a ratio of the light of transmitting the first binder layers 41 becomes larger than that of light of transmitting the second binder layer 42.

As a result, it is possible to obtain an electrophoretic display device 20 having superior display characteristics.

In this regard, it is to be noted that an average thickness of the first binder layers 41 is preferably in the range of about 0.5 to 10 μm, and more preferably in the range of about 1 to 5 μm. This makes it possible to optimize optical transparency and bonding (adhesive) force of the first binder layers 41.

On the other hand, an average thickness of the second binder layer 42 is preferably in the range of about 2 to 15 μm, and more preferably in the range of about 5 to 10 μm. This makes it possible to prevent the size of the electrophoretic display device 20 from being materially large while obtaining sufficient bonding (adhesive) force of the second binder layer 42.

Furthermore, an electric conductivity of each of the first binder layers 41 is preferably in the range of about 20 to 200 μS/cm, and more preferably in the range of about 40 to 100 μS/cm. If the electric conductivity of each of the first binder layers 41 falls within above noted range, it is possible to suppress electric loss in the first binder layers 41, thereby enabling to apply the electric fields to the microcapsules 40 efficiently.

Furthermore, since parasitic capacity of each of the first binder layers 41 can be reduced, it is also possible to suppress a time delay of applying the electric fields to the microcapsules 40. Therefore, it is possible to improve a speed of displaying images displayed by the electrophoretic particles 5 so that it is possible to obtain an electrophoretic display device 20 that can exhibit superior display performance. Further, it is also possible to suppress an involuntary voltage from being applied to the adjacent microcapsules 40.

On the other hand, an electric conductivity of the second binder layer 42 is also preferably in the range of about 20 to 200 μS/cm, and more preferably in the range of about 40 to 100 μS/cm, which is the same as those of the first binder layers 41.

The spaces 43 are included in the microcapsule-containing layer 400. The spaces 43 are spaces between the adjacent microcapsules 40 and between the first electrode 3 and the second electrodes 4.

The spaces 43 may include any kinds of gases, but is preferably filled with air. This makes it possible to include moisture having an adequate amount in the spaces 43. As a result, it is possible to prevent moisture contained in the capsule bodies 401 and the electrophoretic dispersion liquid 10 from materially vaporizing. For this reason, it is also possible to prevent characteristics of the capsule bodies 401 and the electrophoretic dispersion liquid 10 from being materially lowered.

Such spaces 43 can separate and insulate the first electrode 3 and the second electrodes 4 reliably. This makes it possible to reliably prevent short circuit between the first electrode 3 and each of the second electrodes 4 so that it is possible to suppress wasteful electricity consumption by leak current. As a result, it is possible to obtain an electrophoretic display device 20 that can be driven with a low voltage and reduced electricity consumption.

A size of each of the spaces 43 is changed depending on the average thickness of each of the first binder layers 41 and the second binder layer 42, the depth $D_1$ of each of the concave portions 101, and the depth $D_2$ of each of the concave portions 201. When the volume-average particle size of the microcapsules 40 is defined as "d", the size of each of the spaces 43 is preferably in the range of 0.2d to 0.8d, and more preferably in the range of 0.25d to 0.5d.

By providing the spaces 43 having such a size, the electrophoretic display device 20 can suppress the leak current sufficiently without materially lowering display performance.

It is preferred that a pitch between the adjacent concave portions 101 (distance between bottom points of the adjacent concave portions 101) is larger than the volume-average particle size of the microcapsules 40. This makes it possible to fix the microcapsules 40 to the first binder layers 41 in a spaced-apart state so that microcapsules 40 do not bring into contact with each other.

As a result, the spaces 43 are reliably formed between the adjacent microcapsules 40, thereby enabling to reliably suppress leak current between the first electrode 3 and each of the second electrodes 4.

Likewise, it is preferred that a pitch between the adjacent concave portions 201 (distance between bottom points of the adjacent concave portions 201) is larger than the volume-average particle size of the microcapsules 40.

The sealing part 7 is provided between the base members 1 and 2, and along peripheral edges of the first electrode 3, the second electrodes 4, and the microcapsule-containing layer 400. The first electrode 3, the second electrodes 4, and the microcapsule-containing layer 400 are air-tightly sealed by means of the sealing part 7.

This makes it possible to prevent moisture from infiltrating into the electrophoretic display device 20, thereby reliably avoiding degradation in display performance of the electrophoretic display device 20.

Various kinds of resin materials can be used as a constituent material of the sealing part 7. Examples of such resin materials include: an acryl-based resin, an urethane-based resin, an olefin-based resin, an epoxy-based resin, a melamine-based resin, a phenol-based resin, and the like. One or more of these resin materials may be used independently or in combination.

In this regard, it is to be noted that the sealing part 7 may be either provided or removed depending on the circumstances.

Such an electrophoretic display device 20 is operated as follows.

Hereinafter, a description will now be made regarding an operating method of the electrophoretic display device 20.

Figure 2A:
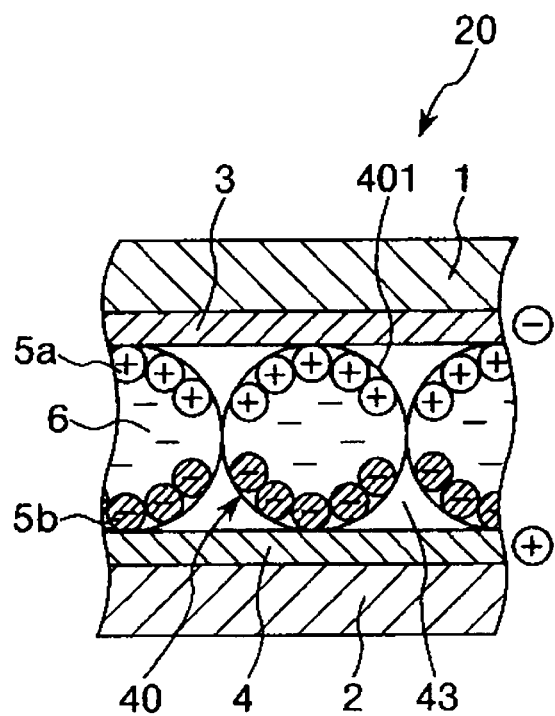
FIGS. 2A and 2B are pattern diagrams for explaining an operating method of the electrophoretic display device shown in FIG. 1.
Figure 2B:
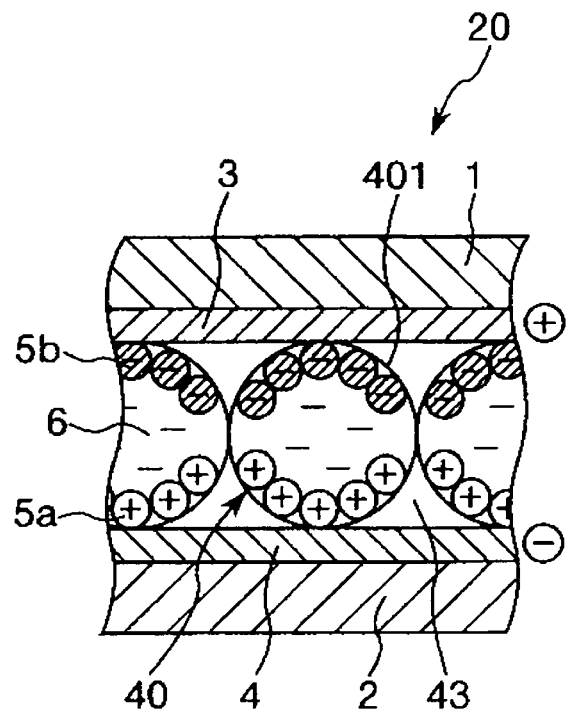

FIGS. 2A and 2B are pattern diagrams for explaining the operating method of the electrophoretic display device shown in FIG. 1. Hereinafter, the upper side in these figures will be referred to as "top" and the lower side will be referred to as "lower".

Upon applying a voltage to between the first electrode 3 and the second electrodes 4 of the electrophoretic display device 20, electric fields are generated across them. The electric fields allow the electrophoretic particles 5 (the colored particles 5b and the white particles 5a) to electrophoretically move toward the respective electrodes.

At that time, by the spaces 43 included in the microcapsule-containing layer 400, insulation property is ensured between the first electrode 3 and the second electrodes 4. In addition, even if a voltage is applied to between the first electrode 3 and each of the second electrodes 4, leak current is prevented. This makes it possible to reduce electricity consumption of the electrophoretic display device 20.

For example, if positively charged particles are used as the white particles 5a and negatively charged particles are used as the colored particles (black particles) 5b, and if the second electrodes 4 are kept in a positive electric potential as illustrated in FIG. 2A, the white particles 5a are moved toward and gathered on the first electrode 3.

On the other hand, the colored particles 5b are moved toward and gathered on the second electrodes 4. Therefore, when observing the electrophoretic display device 20 from the top thereof (namely, the display surface side), the color of the white particles 5a, i.e., a white color, is seen.

In contrast, if the second electrodes 4 are kept in a negative electric potential as illustrated in FIG. 2B, the white particles 5a are moved toward and gathered on the second electrodes 4. On the other hand, the colored particles 5b are moved toward and gathered on the first electrode 3. Therefore, when observing the electrophoretic display device 20 from the top thereof (namely, the display surface side), the color of the colored particles 5b, i.e., a black color, is seen.

If an electrifying amount of the electrophoretic particles 5 (the white particles 5a and the colored particles 5b), a polarity of the first electrode 3 and the second electrodes 4, potential differences between the first electrode 3 and the second electrodes 4 and the like are suitably set in the configuration set forth above, desired information (an image) is displayed on the display surface of the electrophoretic display device 20 according to the combination of colors of the white particles 5a and the colored particles 5b and the number of such particles gathered in the first electrode 3 and the second electrodes 4.

The concave portions 101 can be formed on the lower surface of the base member 1 as needed. Further, the concave portions 201 can be also formed on the upper surface of the base member 2 as needed. But they can be omitted.

Next, a description will be made on another configuration example of the electrophoretic display device 20 according to the present invention. The electrophoretic display device 20 shown in FIG. 3 is a device in which the concave portions 101 and the concave portions 201 are omitted from the electrophoretic display device 20 shown in FIG. 1.

Figure 3:
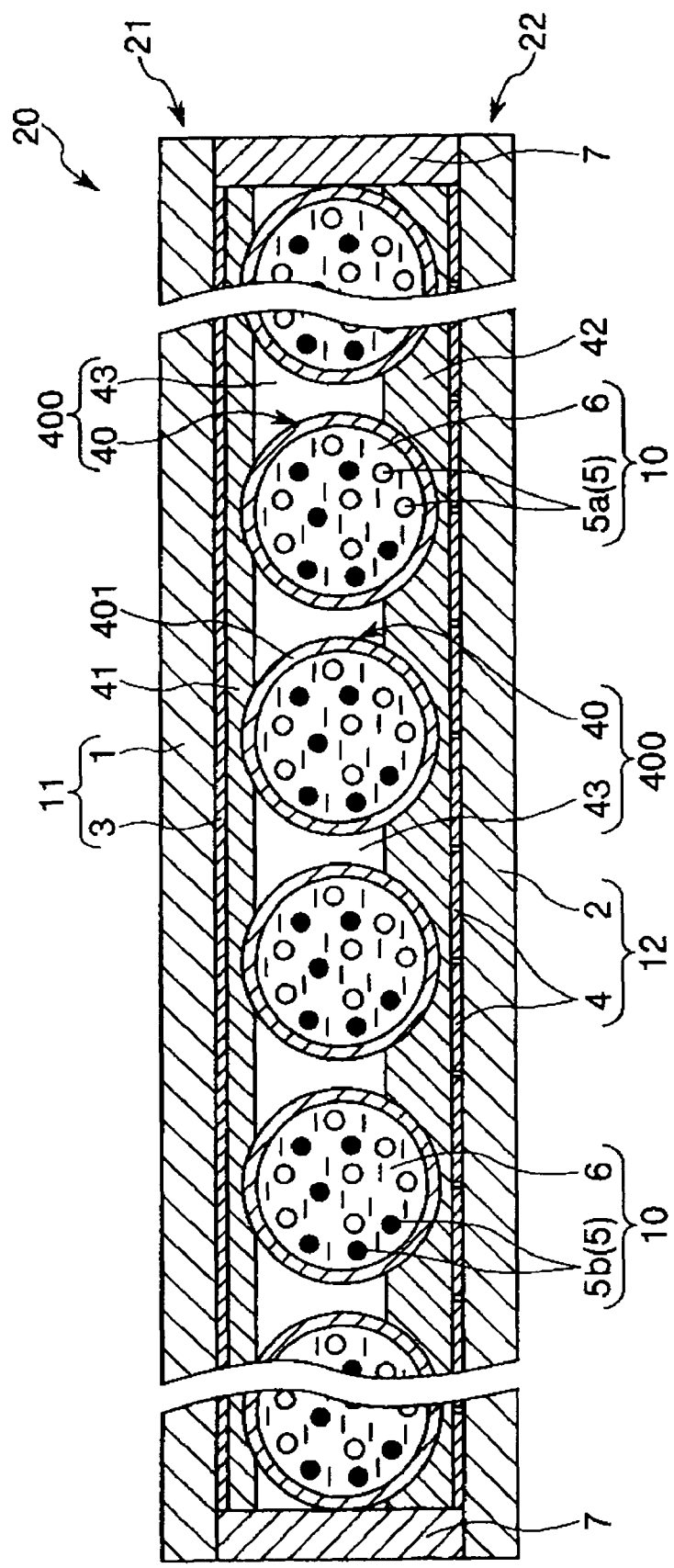
FIG. 3 is a pattern diagram showing a vertical section of another configuration example of the electrophoretic display device according to the present invention.

Since the electrophoretic display device 20 shown in FIG. 3 also has spaces 43 like the electrophoretic display device 20 shown in FIG. 1, it is possible to drive the electrophoretic display device 20 with reduced electricity consumption and a low voltage.

Method of Manufacturing Electrophoretic Display Device

First Embodiment

Next, a description will now be made on a first embodiment of a method of manufacturing the electrophoretic display device 20 shown in FIG. 1 (a method of manufacturing the electrophoretic display device according to the present invention).

FIGS. 4A to 4D are pattern diagrams for explaining the first embodiment of the method of manufacturing the electrophoretic display device according to the present invention. Hereinafter, the upper side in FIGS. 4A to 4D will be referred to as "top" and the lower side will be referred to as "lower".

The method of manufacturing the electrophoretic display device 20 according to the present invention includes five steps as follows. The first step (1A) is a step that a first electrode is formed on a plate-shaped base member 1 on which a plurality of concave portions (hereinafter, simply referred to as "concave portions") 101 are formed to obtain a base substrate 11.

The second step (2A) is a step that first binder layers (sub-first binder layers) 41 are formed on the first electrode 3 provided in the concave portions 101. The third step (3A) is a step that a plurality of microcapsules (hereinafter, simply referred to as "microcapsules") 40 are supplied onto the first binder layers 41 and the first electrode 3 to obtain an electrophoretic display sheet 21.

The fourth step (4A) is a step that a second binder layer 42 is formed on the microcapsules 40 so as not to be brought into contact with the first binder layers 41. The fifth step (5A) is a step that second electrodes 4 provided on a base member 2 are provided on the second binder layer 42.

Hereinafter, a description will be made on each step one after another.

(1A) First, the base substrate 11 which includes a base member 1 having the concave portions 101 and the first electrode 3 formed on an upper surface of the base member 1 is prepared as shown in FIG. 4A.

The first electrode 3 can be formed on the upper surface of the base member 1 by using a deposition method such as various kinds of chemical vapor deposition methods, and various kinds of physical vapor deposition methods.

(2A) Next, the first binder layers 41 are formed on the first electrode 3 which is provided in the concave portions 101 as shown in FIG. 4B.

The first binder layers 41 can be formed as follows. A solution obtained by dissolving a constituent material of the first binder layers 41 to a solvent is supplied on the first electrode 3 provided in the concave portions 101 to obtain a liquid coating film. Thereafter, the solvent contained in the liquid coating film is removed to obtain the first binder layers 41.

Examples of such a solvent to be used the solution include: an inorganic solvent such as nitric acid, sulfuric acid, ammonia, hydrogen peroxide, water, carbon disulfide, and carbon tetrachloride; various kinds of organic solvents; an mixture solvent containing these solvents and the like. The various kinds of organic solvents include: a ketone-based solvent such as methyl ethyl ketone (MEK); an alcohol-based solvent such as methanol, ethanol, isopropanol, and ethylene glycol; an ether-based solvent such as diethylether, and 1,2-dimethoxyethane (DME); a cellosolve-based solvent such as methyl cellosolve, and phenyl cellosolve; aliphatic hydrocarbon such as hexane; aromatic hydrocarbon such as toluene; an aromatic heterocycle compound-based solvent such as methyl pyrolidone; an amide-based solvent such as N,N-dimethylformamide (DMF), and N,N-dimethylacetamide (DMA); a halogenated compound-based solvent such as dichloromethane, chloroform, and 1,2-dichloroethane; an ester-based solvent such as methyl acetate, ethyl acetate, and ethyl formate; a sulfur compound-based solvent such as dimethyl sulfoxid (DMSO), and sulfolane; a nitrile-based solvent such as acetonitrile, propionitrile, and acrylonitrile; an organic acid-based solvent such as formic acid, acetic acid, trichloroacetic acid, and trifluoroacetic acid.

Examples of a method of supplying the solution to the first electrode 3 include: a dipping method, a spin coating method, a casting method, a micro-gravure coating method, a gravure coating method, a bar coating method, a roll coating method, a wire bar coating method, a dip coating method, a spray coating method, a screen printing method, a flexographic printing method, an offset printing method, an inkjet method, and a micro-contact printing method. One or more of these methods may be used independently or in combination.

Examples of a method of removing the solvent from the liquid coating film include: a method of heating the liquid coating film, a method of irradiating infrared ray to the liquid coating film, a method of applying ultrasonic wave to the liquid coating film, and the like. One or more of these methods may be used independently or in combination.

As shown in FIG. 4A, the concave portions 101 are formed on the upper surface of the base member 1 by caving the upper surface of the base member 1 in a concave-shape. The first electrode 3 is provided on the entire upper surface of the base member 1 including the surfaces of the concave portions 101. In other words, the first electrode 3 is provided (disposed) in the concave portions 101.

As shown in FIG. 4B, the first binder layers 41 are selectively formed only in the concave portions 101.

The thickness of each of the first binder layers 41 provided in the concave portions 101 is preferably in the range of about 10 to 60%, and more preferably in the range of about 20 to 50% with respect to the depth $D_1$ of each of the concave portions 101.

By setting the thickness of each of the first binder layers 41 within above noted range, it is possible to ensure sufficient bonding (adhesive) force of the first binder layers 41 to the microcapsules 40. Further, even if the constituent material of the first binder layers 41 is extruded out of the concave portions 101 by the microcapsules 40 which have entered into the concave portions 101, it is possible to reliably prevent the extruded constituent material of the first binder layers 41 from rising up and bringing into contact with the second binder layer 42.

Further, by setting the thickness of each of the first binder layers 41 within above noted range, the particle size of the microcapsules 40 to be fixed by the first binder layers 41 can be uniformed to same extent. Therefore, this means that it is difficult for materially large microcapsules and materially small microcapsules to bring into contact with the first binder layers 41, that is, it becomes difficult that these microcapsules are fixed to the first binder layers 41.

As a result, it is possible to remove microcapsules 40 of the different sizes with ease, thereby being capable of preventing variations in display from occurring in images displayed by the electrophoretic display device 20.

(3A) Next, as shown in FIG. 4C, the microcapsules 40 are supplied onto the first binder layers 41 and the first electrode 3 with a predetermined spacing between the adjacent microcapsules 40. In this way, the electrophoretic display sheet 21 is obtained. In the electrophoretic display sheet 21, the microcapsules 40 are fixed onto the first electrode 3 through the first binder layers 41.

The supply of the microcapsules 40 is carried out as follows. First, a dispersion liquid (microcapsule dispersion liquid) in which the microcapsules 40 are dispersed in a dispersion medium is prepared, and then the dispersion liquid is supplied onto the base substrate 11. Thereafter, the dispersion medium contained in the dispersion liquid is removed.

The dispersion medium can use the same solvents as the solvents described above. Among the solvents described above, the dispersion medium of which specific gravity is smaller than that of the microcapsules 40 is preferable.

Use of such a solvent makes it possible to rapidly settle down the microcapsules 40 when the microcapsule dispersion liquid is supplied onto the first binder layers 41 and the first electrode 3. Therefore, it is possible to efficiently arrange only the microcapsules 40 on the first binder layers 41.

The dispersion medium has preferably volatile property. By using the dispersion medium having volatile property, the dispersion medium can be reliably volatilized and removed in the step in which the dispersion medium is removed as described later. This makes it possible to more easily arrange only the microcapsules 40 on the first binder layers 41.

The method of supplying the dispersion liquid can use the same method as that of supplying the solution described in the step (2A).

Further, the method of removing the dispersion medium can use the same method as that of removing the solvent described in the step (2A).

After the microcapsules 40 are supplied on the first binder layers 41 and the first electrode 3, as needed, the microcapsules 40 are compressed so as to press to the first binder layers 41.

In this way, the relatively large microcapsules are pushed preferentially, thereby enabling the relatively large microcapsules to preferentially enter into the concave portions 101 provided on the base member 1. On the other hand, some of the relatively small microcapsules exist between the relatively large microcapsules which have entered into the concave portions 101. Others of the relatively small microcapsules exist in interspaces between the relatively large microcapsules and the first electrode 3.

However, the others of the relatively small microcapsules are brought to the upper portions of the relatively large microcapsules. As a result, the microcapsules 40 supplied on the first binder layers 41 and the first electrode 3 can be sorted into properly-sized microcapsules 40 which can enter into the concave portions 101 and the improperly-sized microcapsules which can not enter into the concave portions 101 by the size thereof.

In this case, a pressure of pushing the properly-sized microcapsules 40 is preferably in the range of about 0.01 to 0.2 MPa, and more preferably in the range of about 0.05 to 0.1 MPa. By setting the pressure within the above noted range, it is possible to reliably press the properly-sized microcapsules 40 to the first binder layers 41 without breaking the properly-sized microcapsules 40, respectively.

Further, after the microcapsules 40 are supplied onto the first electrode 3 and the first binder layers 41, the first binder layers 41 are heated as needed. In this way, adhesion property is developed in the first binder layers 41 so that the microcapsules 40 can be reliably fixed to the first binder layers 41.

In this regard, a heating temperature of the first binder layers 41 is in the range of about 50 to 120° C., and more preferably in the range of about 70 to 100° C., though may be arbitrarily set depending on the constituent material of the first binder layers 41.

By setting the heating temperature of the first binder layers 41 within the above noted range, it is possible to prevent the microcapsules 40 from being altered and deteriorated due to the heat while generating adhesion property sufficiently in the first binder layers 41.

Further, after the microcapsules 40 are pushed to the first binder layers 41, the electrophoretic display sheet 21 (laminated body of the base member 1, the first electrode 3, and the first binder layers 41 on which the properly-sized microcapsule 40 are fixed) is tilted as needed.

Then, the microcapsules 40 which could have not entered into the concave portions 101, that is, the improperly-sized microcapsules 40 which do not bring into contact with the first binder layers 41 fall from the electrophoretic display sheet 21.

As a result, only properly-sized microcapsules 40 which have entered into the concave portions 101 remain on the base substrate 11. The improperly-sized microcapsules are removed from the electrophoretic display sheet 21 with ease.

In this regard, vibration may be applied to the electrophoretic display sheet 21 as needed. This makes it possible to shake the microcapsules 40 which could have not entered into the concave portions 101, that is, the improperly-sized microcapsules 40 which do not bring into contact with the first binder layers 41 from the electrophoretic display sheet 21.

By carrying out the steps as described above, the microcapsules 40 are fixed to the first electrode 3 through the first binder layers 41 in the electrophoretic display device 20. This makes it possible to reliably allow electric fields to act on the microcapsules 40. As a result, the electrophoretic particles 5 can be reliably moved by the electric fields. The electrophoretic display device 20 can exhibit superior display performance such as contrast.

In the meantime, in a method of manufacturing a conventional electrophoretic display device, microcapsules have been arranged on an electrode by supplying a microcapsule dispersion liquid in which the microcapsules are dispersed in a binder solution on the electrode, and drying the supplied microcapsule dispersion liquid.

In this method, since a viscosity of the microcapsule dispersion liquid is increased by the binder, the microcapsules are often overlapped with each other in a thickness direction of the conventional electrophoretic display device. Therefore, since the overlapped microcapsules are fixed by the binder, it is possible to prevent electrophoretic particles from being moved, thereby lowering contrast.

Further, in the method of manufacturing the conventional electrophoretic display device, there has been a problem that bubbles are mixed in the supplied microcapsule dispersion liquid. The mixed bubbles prevent electric fields from acting on the microcapsules so that the movement of the electrophoretic particles is prevented. As a result, there has been a problem that images are not displayed accurately.

In contrast, according to the method of manufacturing the electrophoretic display device of this embodiment, since the supplying step of the microcapsules 40 and the forming steps of the first binder layers 41 and the second binder layer 42 are carried out separately, the microcapsules 40 which are not fixed by the first binder layers 41 fall with ease.

Therefore, it becomes difficult that the microcapsules 40 are overlapped with each other in the thickness direction of the electrophoretic display device 20. As a result, it is possible to efficiently arrange the microcapsules 40 in a monolayer, thereby enabling the contrast of display to improve.

Further, by sorting the microcapsules 40 depending on the size thereof as described above, it is possible to uniform the size of the microcapsules to be fixed onto the first binder layers 41. This makes it possible to reduce variations in display of images displayed by the electrophoretic display device 20.

Furthermore, since no process of mixing the microcapsules and the binder is carried out in the method according to present invention, the method according to the present invention has an advantage that it is difficult for the bubbles to mix in the first binder layers 41 and the second binder layer 42. Therefore, the movement of the electrophoretic particles 5 is not prevented so that the images can be displayed accurately.

Further, the depth $D_1$ of each of the concave portions 101 provided on the base member 1 are shallower than that of each of the concave portions 202 provided on the base member 2.

When the volume-average particle size of the microcapsules 40 is defined as "d", the depth $D_1$ of each of the concave portions 101 is preferably in the range of about 0.1 d to 0.25 d.

By setting the depth $D_1$ of each of the concave portions 101 within above noted range so as to be relatively shallow, the relatively large microcapsules 40 enter into the concave portions 101. Therefore, it is difficult for the relatively small microcapsules 40 to enter into the concave portions 101. As a result, it is possible to reliably sort the microcapsules 40 in the size thereof.

(4A) Next, as shown in FIG. 4D, the second binder layer 42 is formed on the microcapsules 40. At this time, the formed second binder layer 42 does not bring into contact with the first binder layers 41. In this way, the spaces 43 are formed between the first binder layers 41 and the second binder layer 42.

The second binder layer 42 can be formed on the microcapsules 40 by using the same method as that of the first binder layers 41.

The second binder layer 42 is formed on the microcapsules 40 so as to be brought into contact with the first binder layers 41 as described above. Therefore, when the second binder layer 42 is formed on the microcapsules 40, it is needed that a solution to form the second binder layer 42 does not run down in a downward direction of the electrophoretic display sheet 21, that is, the solution does not flow to the first binder layers 41.

From this viewpoint, the solution to form the second binder layer 42 is set so that a viscosity thereof becomes high. This makes it possible to lower fluidity of the solution, thereby preventing the solution from flowing to the first electrode 3.

In this regard, the viscosity of the solution can be adjust by arbitrarily setting a mixing ratio of the constituent material of the second binder layer 42 and the solvent, a temperature of the solution, and the like.

Figures 5A, 5B, 5C:
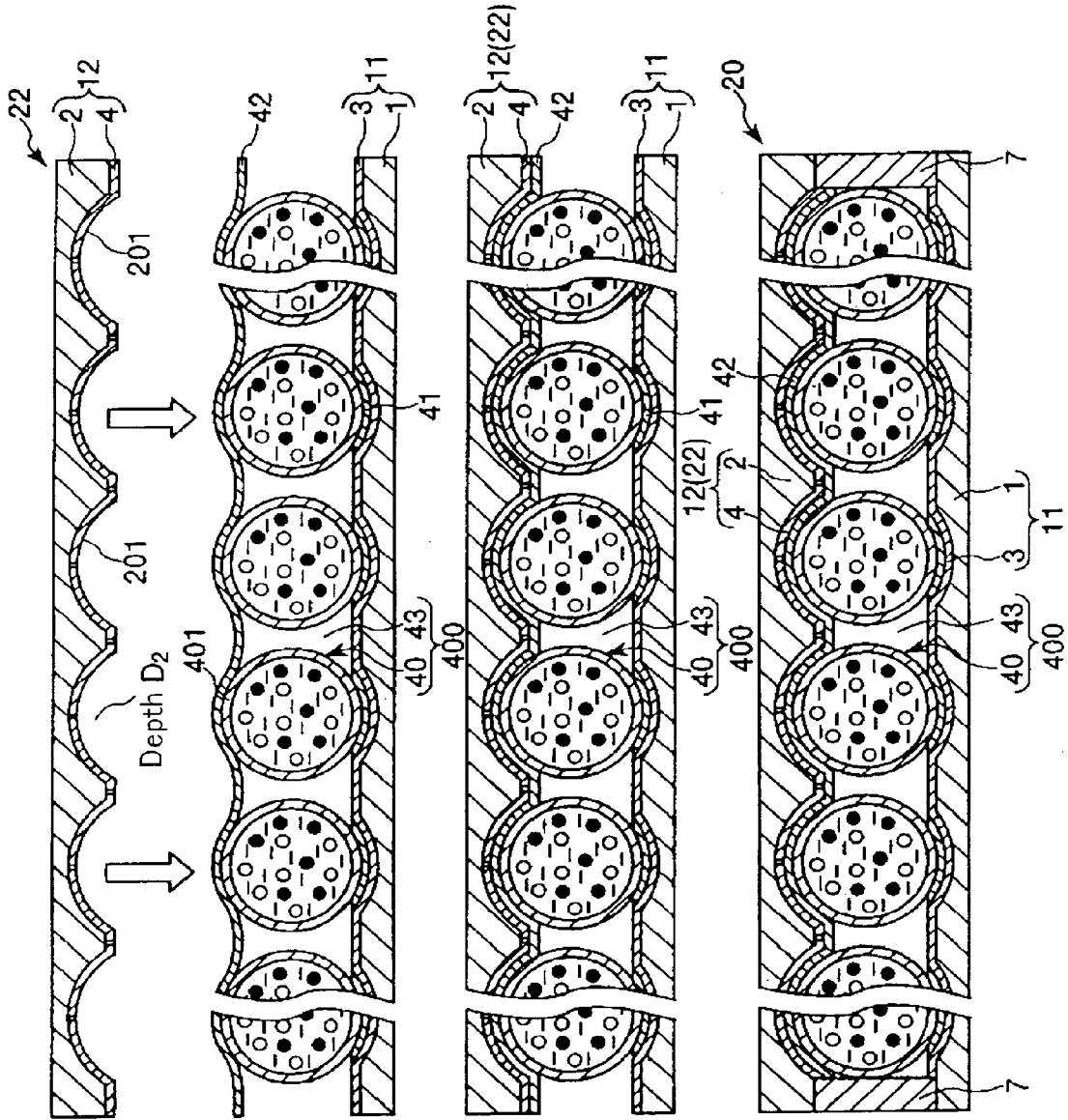
FIGS. 5A to 5C are pattern diagrams for explaining the first embodiment of the method of manufacturing the electrophoretic display device according to the present invention.

(5A) Next, the second electrodes 4 provided on the base member 2 are set on the second binder layer 42 as shown in the FIG. 5A. This makes it possible to obtain an electrophoretic display device 20. The second electrodes 4 can be formed on the lower surface of the base member 2 by using the same method as that of the first electrode 3 described above.

Further, the concave portions 201 are formed on the lower surface of base member 2 by allowing the lower surface of the base member 2 to cave in the upper direction thereof as shown in FIG. 5A.

After the step (5A) has been carried out, the base members 1 and 2 are compressed so as to approach them as needed. This makes it possible to reliably allow the microcapsules 40 to enter into the concave portions 201 as shown FIG. 5B.

As a result, the lower portions of the microcapsules 40 can enter into the concave portions 101, respectively, and the upper portions of the microcapsules 40 can enter into the concave portions 201, respectively. This makes it possible to reliably control positions of the microcapsules 40 in the microcapsule-containing layer 401.

Further, the first binder layers 41 and the second binder layer 42 are heated as needed like the step (3A) and (4A). In this way, adhesion property is developed in the first binder layers 41 and the second binder layer 42 so that the microcapsules 40 can be reliably fixed onto the first binder layers 41 and the second binder layer 42.

Next, as illustrated in FIG. 5C, the sealing portion 7 is formed along the edges of the first electrode 3, the second electrodes 4, the second binder layer 42, and the microcapsules 40.

The sealing portion 7 can be formed by supplying a sealing portion formation material to between the base member 2 and the base member 1 along the edges thereof through use of, e.g., a dispenser, and then solidifying or curing the sealing portion formation material.

The electrophoretic display device 20 shown in FIG. 1 is manufactured through the steps described above.

Second Embodiment

Next, a description will be made on a second embodiment of the method of manufacturing the electrophoretic display device 20 shown in FIG. 1 (the method of manufacturing the electrophoretic display device according to the present invention).

FIGS. 6A to 6C are pattern diagrams for explaining a second embodiment of a method of manufacturing the electrophoretic display device according to the present invention. In the following description, the upper side in FIGS. 6A to 6C will be referred to as "upper" with the lower side as "lower", for the purpose of convenience in the description.

Hereinafter, the method of manufacturing the electrophoretic display device of the second embodiment will be described, with emphasis placed on the differing points from the electrophoretic display device of the first embodiment but with no description made on the same matters.

The method of manufacturing the electrophoretic display device according to this embodiment is the same as the method of the first embodiment, except that a fourth step and a fifth step are different from those of the method of the first embodiment.

In other words, the method of manufacturing the electrophoretic display device 20 according to this embodiment includes five steps as follows.

The first step (1B) is a step that a first electrode is formed on a plate-shaped base member 1 on which concave portions 101 are formed to obtain a base substrate 11. The second step (2B) is a step that first binder layers (sub-first binder layers) 41 are formed on the first electrode 3 provided in the concave portions 101.

The third step (3B) is a step that microcapsules 40 are supplied onto the first binder layers 41 and the first electrode 3 to obtain an electrophoretic display sheet 21.

The fourth step (4B) is a step that a second binder layer 42 is preliminarily formed on lower surfaces of second electrodes 4 provided (disposed) in concave portions 201 formed on a base member 2.

The fifth step (5B) is a step that the second binder layer 42 formed on the second electrodes 4 is provided on the microcapsules 40 so that the concave portions 201 provided on the lower surface of the base member 2 correspond to the microcapsules 40. Then, the microcapsules 40 are allowed the second binder layer 42 to adhere.

In this regard, the fourth step (4B) and the fifth step (5B) can be carried out simultaneously. Hereinafter, a description will be made on each step one after another.

(1B) First, the base member 1 having the concave portions 101 and the first electrode 3 formed on an upper surface of the base member 1, that is, the base substrate 11 is prepared in the same manner as the first embodiment described above.

(2B) Next, the first binder layers 41 are formed on the first electrode 3 provided in the concave portions 101 in the same manner as the first embodiment described above as shown in FIG. 4B.

(3B) Next, as shown in FIG. 4C, the microcapsules 40 are supplied onto the first electrode 3 and the first binder layers 41 in the same manner as the first embodiment described above. In this way, an electrophoretic display sheet (front plane) 21 is obtained.

(4B) Next, the second electrodes 4 are formed on the lower surface of the base member 2 as shown in FIG. 6A to obtain a circuit substrate (back plane) 22 (opposite substrate 12). Next, as shown in FIG. 6A, the second binder layer 42 is formed on the lower surface of the second electrodes 4. The second binder layer 42 is formed in the same manner as the first embodiment described above.

In this regard, the base member 2 have the concave portions 201 on the lower surface thereof like that of the first embodiment described above. The second electrodes 4 are formed on the entire lower surface of the base member 2. That is, the second electrodes 4 are disposed in the concave portions 201.

Further, the second binder layer 42 is formed on entire lower surface of the opposite substrate 12 so as to cover the second electrodes 4. A part of a constituent material of the second binder layer 42 enters into the concave portions 201 as described later.

As a result, the part of the constituent material the second binder layer 42 entering into the concave portions 201 exhibits an anchor effect, thereby the second binder layer 42 are reliably allowed to adhere to the second electrodes 4.

The formation of the second binder layer 42 normally is carried out in a state that surfaces of the second electrodes 4 to form it are turn up (in a state that base substrate 12 as shown in FIG. 6A is reversed up and down). After the second binder layer 42 is formed on the second electrodes 4, the opposite substrate 12 provided with the second binder layer 42 is reversed up and down again to set in a state as shown in FIG. 6A.

At that time, the second binder layer 42 does not fall from the second electrodes 4 by its own weight due to a gravity thereof. That is, the second binder layer 42 can adhere to the second electrodes 4 reliably. This is because the second binder layer 42 adheres to the second electrodes 4 reliably as described above.

(5B) Next, the opposite substrate 12 (circuit substrate 22) providing with the second binder layers 42 is provided on the electrophoretic display sheet 21 so that the microcapsules 40 adhere to the second binder layer 42 as shown in FIG. 6A and FIG. 6B.

Thereafter, the sealing portion 7 is formed along the edges of the first electrode 3, the second electrodes 4, the second binder layer 42, and the microcapsules 40. By carrying out above steps, the electrophoretic display device 20 as shown in FIG. 1 is manufactured as shown in FIG. 6C.

When the second binder layer 42 provided on the opposite substrate 12 is provided on the microcapsules 40 of the electrophoretic display sheet 21, the second binder layer 42 may be provided from the lower side of the electrophoretic display sheet 21 to the microcapsules 40 in a state that the electrophoretic display sheet 21 is set so that the surface of the base substrate 11 on which the microcapsules 40 are provided faces in a vertical direction. Such an providing step is reversely carried out to that shown in FIG. 6A.

In such an providing step, unnecessary microcapsules 40 of the microcapsules 40 (that is, microcapsules 40 overlapping in the thickness direction of the electrophoretic display device 20), which do not bring into contact with the first binder layers 41, fall from the electrophoretic display sheet 21 by itself in the step that the second binder layer 42 provided on the opposite substrate 12 is provided on the microcapsules 40 of the electrophoretic display sheet 21.

Therefore, the unnecessary microcapsules 40 can be removed from the electrophoretic display sheet 21 with ease without subjecting to a specific treatment.

In this embodiment, since the second binder layer 42 adheres to the second electrodes 4 reliably, it is possible to prevent the second binder layer 42 from being peeled from the second electrodes 4. Therefore, when the circuit substrate 22 is overlapped on the electrophoretic display sheet 21, it is reliably prevented that the second binder layer 42 falls from the second electrodes 4 and brings into contact with the first binder layers 41.

Therefore, the spaces 43 are reliably formed between the first binder layers 41 and the second binder layer 42. As a result, the electrophoretic display device 20 shown in FIG. 1 can be manufactured efficiently.

In this embodiment, since the fourth step and the fifth step can be carried out simultaneously, it is possible to improve working efficiency. Further, the second binder layer 42 is provided to the microcapsules 40 of the electrophoretic display sheet 21 in a state that the second binder layer 42 is preliminarily formed on the second electrodes 4. Therefore, the present invention can be obtained an advantage in that it is difficult for bubbles to mix between the second binder layer 42 and the second electrodes 4.

The electrophoretic display device 20 manufactured as described above can display images having high contrast and reduced variations in display. The electrophoretic display device 20 manufactured as described above can also exhibit superior display performance.

Electronic Device

The electrophoretic display device 20 described above can be used for constituting a variety of electronic device. Hereinafter, a description will be made on examples of the electronic device of the present invention provided with the electrophoretic display device 20.

Electronic Paper

First, a description will be offered regarding an embodiment in which the electronic device of the present invention is used in an electronic paper.

Figure 7:
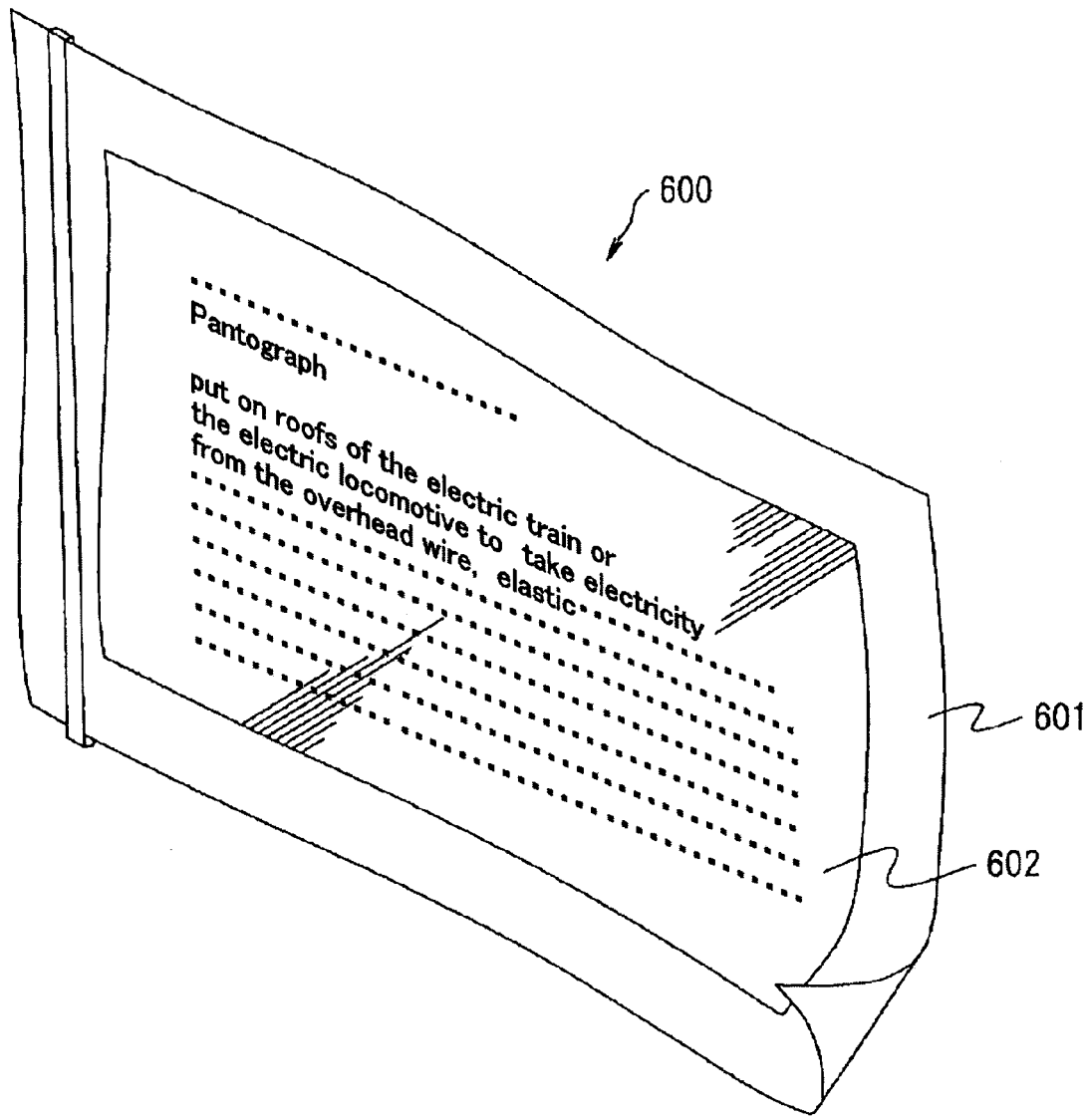
FIG. 7 is a perspective view showing an embodiment in which the electronic device according to the present invention is used in an electronic paper.

FIG. 7 is a perspective view showing an embodiment in which the electronic device according to the present invention is used in an electronic paper.

The electronic paper 600 shown in FIG. 7 includes a main body 601 formed of a rewritable sheet having the same texture and flexibility as that of a paper sheet, and a display unit 602 attached to the main body 601. In the electronic paper 600, the display unit 602 is formed from the electrophoretic display device 20 described above.

Display Device

Figure 8A:
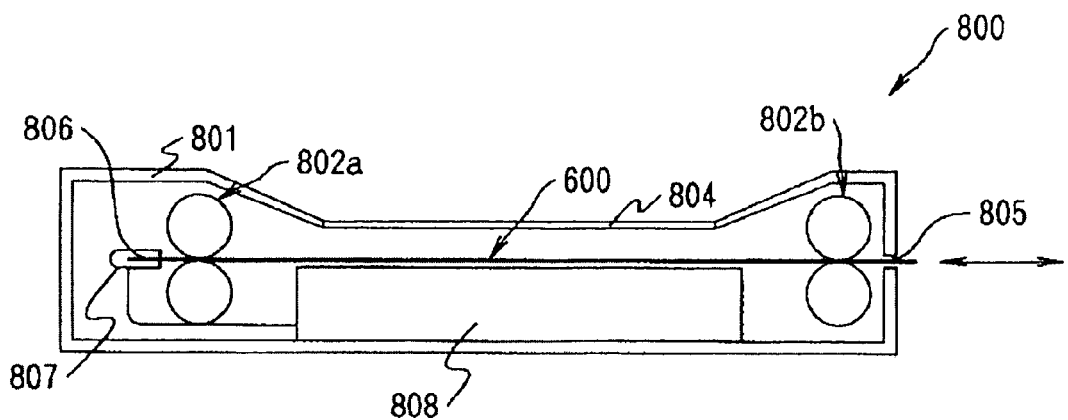
FIGS. 8A and 8B are section and plan views showing an embodiment in which the electronic device according to the present invention is used in a display device.
Figure 8B:
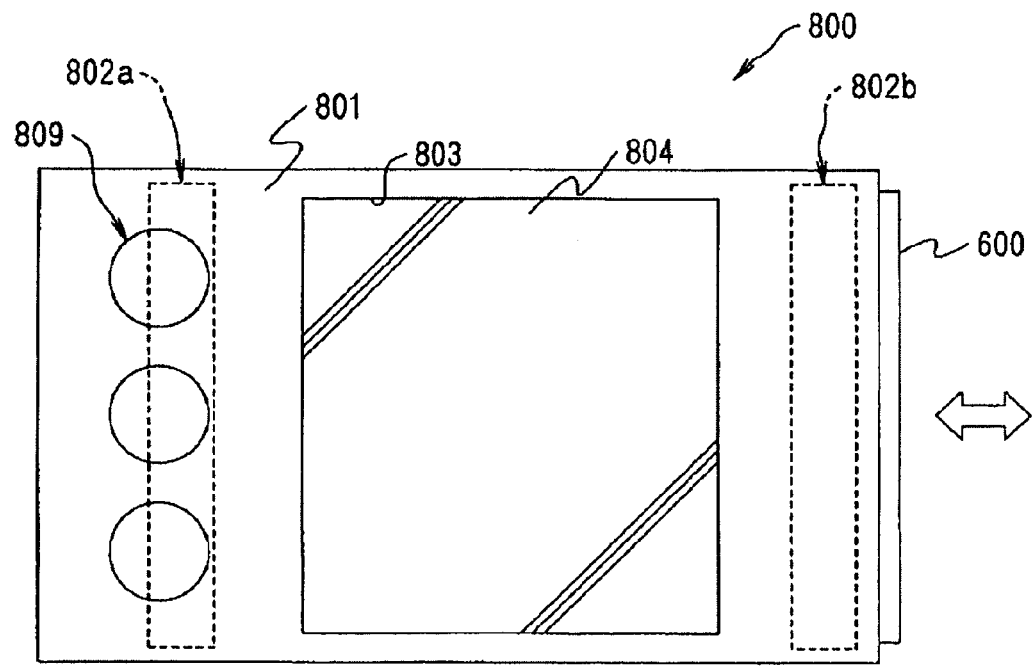

Next, a description will be offered regarding an embodiment in which the electronic device of the present invention is used in a display device. FIGS. 8A and 8B are section and plan views showing an embodiment in which the electronic device according to the present invention is used in a display device.

The display device 800 shown in FIGS. 8A and 8B include a main body portion 801 and an electronic paper 600 detachably attached to the main body portion 801. The electronic paper 600 is of the same configuration as set forth above, i.e., the same configuration as shown in FIGS. 8A and 8B.

Formed on one lateral side (the right side in FIG. 8A) of the main body portion 801 is an insertion slot 805 through which the electronic paper 600 can be inserted. Two pairs of conveying rollers 802a and 802b are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802a and 802b.

A rectangular opening 803 is formed on a display surface side (the front side in FIG. 8B) of the main body portion 801 and a transparent glass plate 804 is fitted to the rectangular opening 803. This allows the electronic paper 600 held within the main body portion 801 to be visually recognized from the outside of the main body portion 801.

In other words, the display device 800 has a display surface that allows the electronic paper 600 held within the main body portion 801 to be visually recognized through the transparent glass plate 804.

A terminal portion 806 is formed in a leading edge portion (the left side in FIGS. 8A and 8B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display device 800 set forth above, the electronic paper 600 is removably fitted to the main body portion 801 and is portable in a state that it is removed from the main body portion 801.

Furthermore, the electronic paper 600 of the display device 800 is formed from the electrophoretic display device 20 described above.

In this regard, it is to be noted that the electronic device of the present invention is not limited to the uses as described above. Examples of other uses of the electronic device include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The present electrophoretic display device 20 can be used in display parts of the various kinds of electronic device described above.

Although the method of manufacturing the electrophoretic display device, the electrophoretic display device and the electronic device of the present invention have been described with reference to the illustrated embodiments, the present invention is not limited thereto.

The configuration of each component may possibly be replaced by other arbitrary configurations having equivalent functions. It may also be possible to add other optional components to the present invention.

Furthermore, although each of the microcapsules is arranged to extend over two neighboring pixel electrodes in the foregoing embodiments, the present invention is not limited thereto. As an alternative example, each of the microcapsules may be arranged to extend over three neighboring pixel electrodes or may be arranged not to extend over neighboring electrodes. It may also be possible to employ the combination of these arrangements.

Furthermore, the method of manufacturing the electrophoretic display device of the present invention may be provided by combining two or more arbitrary steps (features) employed in the respective embodiments described above. In the method for manufacturing electrophoretic display device of the present invention, one or more step may be added for an arbitrary purpose.

EXAMPLES

Next, a description will be made on specific experimental examples of the present invention.

1. Manufacture of Electrophoretic Display Device

Example 1

<1> First, a PET substrate (first base member) constituted of aluminium, which was provided with concave portions on an entire surface thereof, was prepared. Next, a first electrode was formed on the surface of the PET substrate to obtain a base substrate. In this way, the first electrode was provided (disposed) in the concave portions. An average depth of the concave portions of the PET substrate was 5 μm.

Further, an acryl-based resin in which ITO particles were dispersed was prepared. Next, a binder solution was prepared by dissolving the acryl-based resin to a ketone-based solvent. Next, the binder solution was supplied onto the first electrode provided in the concave portions, and then the supplied binder solution was dried to obtain first binder layers.

In this regard, it is to be noted that the first binder layers were selectively provided on only the first electrodes provided in the concave portions. Further, an average thickness of the first binder layers was 2 μm. An electric conductivity of each of the first binder layers was 60 μS/cm.

<2> Next, a plurality of microcapsules including a electrophoretic dispersion liquid (of which volume-average particle size was 40 μm) were prepared, and then a microcapsule dispersion liquid was prepared by dispersing the plurality of microcapsules to a dispersion medium.

Next, the microcapsule dispersion liquid was supplied onto the first binder layers and the first electrode, and then the supplied microcapsule dispersion liquid was dried. In this way, the plurality of microcapsules were arranged on the first binder layers. That is, properly-sized microcapsules (relatively large microcapsules) of the plurality of microcapsules were arranged on the first binder layers.

Thereafter, the plurality of microcapsules (properly-sized microcapsules) were pushed to the first binder layers by a power of 0.1 MPa. In this way, the properly-sized microcapsules entered into the concave portions. On the other hand, improperly-sized microcapsules of the plurality of microcapsules were not arranged on the first binder layers.

Next, the base substrate on which the plurality of microcapsules were arranged, that is, an electrophoretic display sheet was tilted to obtain tilt. Then, vibration was applied to the tilted electrophoretic display sheet. The tilt and the vibration made it possible to allow the improperly-sized microcapsules which could not enter into the concave portions, that is, relatively small microcapsules to selectively fall from the electrophoretic display sheet.

<3> Next, an acryl-based resin in which ITO particles were dispersed was prepared. Next, a binder solution was prepared by dissolving the acryl-based resin to a ketone-based solvent. A viscosity of the binder solution is set larger than that of the binder solution prepared in the step <1> described above.

Next, the binder solution was supplied onto the properly-sized microcapsules arranged onto the first binder layers, and then dried it. At this time, the supplied binder solution was set so as not to be brought into contact with the first binder layers.

In this way, a second binder layer was formed on the properly-sized microcapsules. An average thickness of the second binder layer was 8 μm. An electric conductivity of the second binder layer was 60 μS/cm. In this regard, spaces of which size in a thickness direction of an electrophoretic display device was 15 μm were formed between the properly-sized microcapsules and between the first binder layers and the second binder layer.

<4> Further, a PET substrate (second base member) constituted of ITO, which was provided with concave portions on an entire surface thereof, was prepared. Next, second electrodes were formed on the entire surface of the PET substrate to obtain an opposite substrate. In this way, the second electrodes were provided (disposed) in the concave portions.

An average depth of the concave portions of the PET substrate was 10 μm. TFT circuits were formed on the PET substrate preliminarily.

Next, the second electrodes provided on the PET substrate was provided on the second binder layer so that the second electrodes adhere to the second binder layer, that is, the concave portions of the PET substrate correspond to the properly-sized microcapsules. As a result, the PET substrate, the first electrode, the first binder layers, the properly-sized microcapsules, the second binder layer, the second electrodes, and the PET substrate were laminated in this order to obtain a laminated body.

<5> Next, the laminated body was compressed by a pressure of 0.1 MPa in a thickness direction thereof, and then the properly-sized microcapsules entered into the concave portions in which the second electrodes were provided. Next, the compressed laminated body was heated at a temperature of 80° C.

In this way, adhesive property of each of the first binder layers and the second binder layer was improved so that the properly-sized microcapsules were fixed by the first binder layers and the second binder layer.

Next, an edge (an outer circumferential portion) of the laminated body obtained in the step (4) was sealed off with an epoxy-based adhesive agent, to thereby obtain an electrophoretic display device as shown in FIG. 1.

Example 2

An electrophoretic display device was manufactured in the same manner as the Example 1 except that the following steps were carried out. By using the binder solution obtained in the step (3) of the Example 1, a second binder layer was formed on a surface of the opposite substrate in which the second electrodes were formed on the base member. Thereafter, the formed second binder layer was provided on the properly-sized microcapsules so that the second binder layer was brought into contact with the properly-sized microcapsules.

In other words, the PET substrate, the first electrode, the first binder layers, the properly-sized microcapsules, the second binder layer, the second electrodes, and the PET substrate were laminated in this order to obtain a laminated body.

In this regard, it is to be noted that the second binder layer preliminarily formed on the surface of the opposite substrate was provided on the entire surfaces of the second electrodes.

Further, the concave portions in which the second electrodes were provided were filled with the binder solution to obtain the second binder layer.

In this regard, spaces of which size in a thickness direction of the laminated body was 15 μm were formed between the properly-sized microcapsules and between the first binder layers and the second binder layer.

Example 3

An electrophoretic display device was manufactured in the same manner as the Example 2 except that the depth $D_2$ of each of the concave portions provided on the surface of the base member was changed to 5 μm.

In this regard, spaces of which size in the thickness direction of the laminated body was 20 μm were formed between the properly-sized microcapsules and between the first binder layers and the second binder layer.

Example 4

An electrophoretic display device was manufactured in the same manner as the Example 2 except that the depth $D_1$ of each of the concave portions provided on the surface of the base member was changed to 5 μm and the depth $D_2$ of each of the concave portions provided on the surface of the base member was changed to 15 μm.

In this regard, spaces of which size in the thickness direction of the laminated body was 10 μm were formed between the properly-sized microcapsules and between the first binder layers and the second binder layer.

Example 5

An electrophoretic display device was manufactured in the same manner as the Example 2 except that the depth $D_1$ of each of the concave portions provided on the surface of the base member was changed to 5 μm and the depth $D_2$ of each of the concave portions provided on the surface of the base member was changed to 20 μm.

In this regard, spaces of which size in the thickness direction of the laminated body was 5 μm were formed between the properly-sized microcapsules and between the first binder layers and the second binder layer.

Example 6

An electrophoretic display device was manufactured in the same manner as the Example 1 except that base members in which concave portions were not formed were used to the base substrate (which was formed from the first electrode and the PET substrate) and the opposite substrate (which was formed from the second electrodes and the PET substrate).

In this regard, spaces of which size in the thickness direction of the laminated body was 20 μm were formed between the properly-sized microcapsules and between the first binder layers and the second binder layer.

Example 7

An electrophoretic display device was manufactured in the same manner as the Example 2 except that base members in which concave portions were not formed were used to the base substrate (which was formed from the first electrode and the PET substrate) and the opposite substrate (which was formed from the second electrodes and the PET substrate).

In this regard, spaces of which size in the thickness direction of the laminated body was 20 μm were formed between the properly-sized microcapsules and between the first binder layers and the second binder layer.

Comparative Example 1

An electrophoretic display device was manufactured in the same manner as the Example 1 except that a space between a first electrode and second electrodes was filled with properly-sized microcapsules and a binder solution so that the spaces were not formed between the properly-sized microcapsules and between the first binder layers and the second binder layer.

First, a PET substrate having concave portions was prepared in the same manner as the Example 1. Next, a first electrode was formed on a surface (of concave portions side) of the PET substrate to obtain a base substrate.

Next, a plurality of microcapsules including a electrophoretic dispersion liquid (of which volume-average particle size was 40 μm) were prepared, and then a microcapsule dispersion liquid was prepared by mixing the plurality of microcapsules, an acryl-based resin (constituent material of a binder), and a dispersion medium to each other.

Next, the microcapsule dispersion liquid was supplied onto the first electrode, and then the dispersion medium contained in the supplied microcapsule dispersion liquid was removed. In this way, properly-sized microcapsules of the plurality of microcapsules were arranged on the first electrode and space between the properly-sized microcapsules was filled with the binder. That is, a microcapsule-containing layer was obtained.

On the other hand, a PET substrate having concave portions was prepared. Next, second electrodes were formed on a surface (of concave portions side) of the PET substrate to obtain an opposite substrate.

A laminated body was obtained by providing the second electrodes of the opposite substrate on the properly-sized microcapsules so that the properly-sized microcapsules adhered to the second electrodes.

Next, the laminated body was compressed in the same manner as the Example 1, and then, an edge (an outer circumferential portion) of the laminated body was sealed off with an epoxy-based adhesive agent in the same manner as the Example 1, to thereby obtain an electrophoretic display device as shown in FIG. 1.

Comparative Example 2

An electrophoretic display device was manufactured in the same manner as the Example 3 except that a space between a first electrode and second electrodes was filled with properly-sized microcapsules and a binder solution so that the spaces were not formed between the properly-sized microcapsules and between the first binder layers and the second binder layer.

First, a plate-shaped PET substrate having no concave portions was prepared in the same manner as the Example 3. Next, a first electrode was formed on a surface of the PET substrate to obtain a base substrate.

Next, a plurality of microcapsules including a electrophoretic dispersion liquid (of which volume-average particle size was 40 μm) were prepared, and then a microcapsule dispersion liquid was prepared by mixing the plurality of microcapsules, an acryl-based resin (constituent material of a binder), and a dispersion medium to each other.

Next, the microcapsule dispersion liquid was supplied onto the first electrode, and then the dispersion medium contained in the supplied microcapsule dispersion liquid was removed. In this way, properly-sized microcapsules of the plurality of microcapsules were arranged on the first electrode and spaces between the properly-sized microcapsules were filled with the binder. That is, a microcapsule-containing layer was obtained.

On the other hand, a plate-shaped PET substrate having no concave portions was prepared. Next, second electrodes were formed on a surface of the PET substrate to obtain an opposite substrate.

A laminated body was obtained by providing the second electrodes of the opposite substrate on the properly-sized microcapsules so that the properly-sized microcapsules adhered to the second electrodes.

Next, the laminated body was compressed in the same manner as the Example 3, and then, an edge (an outer circumferential portion) of the laminated body was sealed off with an epoxy-based adhesive agent in the same manner as the Example 1, to thereby obtain an electrophoretic display device as shown in FIG. 1.

Comparative Example 3

An electrophoretic display device was manufactured in the same manner as the Example 1 except that a binder solution having a low viscosity was used for forming a second binder layer as a binder solution, and the second binder layer was formed so as to fill the spaces between the properly-sized microcapsules. Thus obtained electrophoretic display device did not have the spaces between the properly-sized microcapsules and between the first electrode and the second electrodes.

Comparative Example 4

An electrophoretic display device was manufactured in the same manner as the Example 7 except that a binder solution having a low viscosity was used for forming a second binder layer as a binder solution, and the second binder layer was formed so as to fill the spaces between the properly-sized microcapsules. Thus obtained electrophoretic display device did not have the spaces between the properly-sized microcapsules and between the first electrode and the second electrodes.

2. Evaluation 2.1 Measurement of Contrast Ratio in Display and Leak Current

In the electrophoretic display device manufactured in each of the Examples 1 to 7 and the Comparative Examples 1 to 4, images were displayed by using the electrophoretic display device. Thereafter, contrast ratio in display was obtained in the images and leak current was measured.

The images were subjected to a reflectance meter to obtain a colored reflectance and a white reflectance. The contrast ratio in the display was calculated as follows. The colored reflectance in a colored display area was defined as "Rc" and the white reflectance in a white display area was defined as "Rw". The constant ratio was calculated by using the relation: "Rw/Rc".

The leak current was measured by using an ammeter under the following measurement conditions to obtain a leak current value. The obtained leak current value was divided by an area in which the surface of the first electrode opposite to the surface of each of the second electrodes. That is, the obtained leak current value was shown as a current density in Table 1.

Measurement Conditions of Leak Current

A voltage to be applied to between the first electrode and each of the second electrodes was set DC 15 V. A time to apply the voltage to between the first electrode and each of the second electrodes was set 400 milliseconds. When current became stable after the voltage was applied to between the first electrode and each of the second electrodes, the leak current (constant leak current) was measured.

2.2 Evaluation of Arrangement of Microcapsules and Bubbles Mixed to First Binder Layers and/or Second Binder Layer The electrophoretic display device manufactured in each of the Examples 1 to 7 and the Comparative Examples 1 to 4 was cut along a long direction thereof by using a dicing apparatus to obtain a cross-section surface of the electrophoretic display device. Then, the cross-section surface of the cut electrophoretic display device was observed as shown in FIG. 1.

First, the arrangement of the properly-sized microcapsules included in the electrophoretic display device was observed by using an optical microscope and an electron scanning microscope. As a result, the arrangement of the properly-sized microcapsules was evaluated by the following two criteria.

Next, bubbles which have been mixed to the first binder layers and/or the second binder layer included in the electrophoretic display device was observed by using the optical microscope and the electron scanning microscope. As a result, the bubbles were evaluated by the following four criteria.

Evaluation Criteria of Arrangement of Microcapsules

A: The properly-sized microcapsules were arranged in a substantially monolayer. That is to say, the properly-sized microcapsules were a side by side relation.

B: There were a large number of portions in which the microcapsules (properly-sized and the improperly-sized) were overlapped each other.

Evaluation Criteria of Bubbles Mixed to First Binder Layers and/or Second Binder Layer A: Bubbles were not virtually mixed to the first binder layers and/or the second binder layer.

B: Fine bubbles were slightly mixed to the first binder layers and/or the second binder layer.

C: Large bubbles were mixed to some positions of the first binder layers and/or the second binder layer.

D: A large number of bubbles were mixed to the entire first binder layers and/or the entire second binder layer.

Hereinafter, evaluation results of the items 2.1 and 2.2 are shown in Table 1.

TABLE 1

| | Conditions of manufacturing electrophoretic display device | | | | | | | | | |
|---|---|---|---|---|---|---|---|---|---|---|
| | | | Spaces | | Concave portions | | Evaluation results | | | |
| | | | | | Depth of each concave portions provided on first base member | Depth of each concave portions provided on second base member | | Leak current | | |
| | Method of supplying microcapsules | Method of forming second binder layer | Existence | Size | Existence | | | Display contrast | [μA/cm$^2$] | Arrangement of microcapsules | Bubbles |
| Ex. 1 | Microcapsules are separately supplied with constituent material of second binder layer | Second binder layer and second electrodes are separately formed | Yes | 15 μm (0.375d) | Yes | 5 μm (0.125d) | 10 μm (0.25d) | 6.7 | 0.095 | A | B |
| Ex. 2 | Microcapsules are separately supplied with constituent material of second binder layer | Second binder layer are preliminarily formed on second electrodes | Yes | 15 μm (0.375d) | Yes | 5 μm (0.125d) | 10 μm (0.25d) | 7.3 | 0.081 | A | A |
| Ex. 3 | Microcapsules are separately supplied with | Second binder layer are preliminarily | Yes | 20 μm (0.50d) | Yes | 5 μm (0.125d) | 5 μm (0.125d) | 6.8 | 0.076 | A | A |

TABLE 1-continued

Conditions of manufacturing electrophoretic display device

|  | Method of supplying microcapsules | Method of forming second binder layer | Spaces Existence | Spaces Size | Concave portions Existence | Depth of each concave portions provided on first base member | Depth of each concave portions provided on second base member | Display contrast | Evaluation results Leak current [μA/cm²] | Arrangement of micro- capsules | Bubbles |
|---|---|---|---|---|---|---|---|---|---|---|---|
|  | constituent material of second binder layer | formed on second electrodes |  |  |  |  |  |  |  |  |  |
| Ex. 4 | Microcapsules are separately supplied with constituent material of second binder layer | Second binder layer are preliminarily formed on second electrodes | Yes | 10 μm (0.25d) | Yes | 5 μm (0.125d) | 15 μm (0.375d) | 7.4 | 0.12 | A | A |
| Ex. 5 | Microcapsules are separately supplied with constituent material of second binder layer | Second binder layer are preliminarily formed on second electrodes | Yes | 5 μm (0.125d) | Yes | 5 μm (0.125d) | 20 μm (0.50d) | 7.1 | 0.15 | A | A |
| Ex. 6 | Microcapsules are separately supplied with constituent material of second binder layer | Second binder layer and second electrodes are separately formed | Yes | 20 μm (0.50d) | No | — | — | 5.4 | 0.098 | A | B |
| Ex. 7 | Microcapsules are separately supplied with constituent material of second binder layer | Second binder layer are preliminarily formed on second electrodes | Yes | 20 μm (0.50d) | No | — | — | 5.2 | 0.086 | A | A |
| Comp. Ex. 1 | Microcapsules are simultaneously supplied with constituent material of second binder layer | — | No | — | Yes | 5 μm (0.125d) | 10 μm (0.25d) | 3.2 | 0.75 | B | D |
| Comp. Ex. 2 | Microcapsules are simultaneously supplied with constituent material of second binder layer | — | No | — | No | — | — | 2.8 | 0.81 | B | D |
| Comp. Ex. 3 | Microcapsules are separately supplied with constituent material of second binder layer | Second binder layer and second electrodes are separately formed | No | — | Yes | 5 μm (0.125d) | 10 μm (0.25d) | 4.5 | 0.54 | A | B |
| Comp. Ex. 4 | Microcapsules are separately supplied with constituent material of second binder layer | Second binder layer are preliminarily formed on second electrodes | No | — | No | — | — | 5.1 | 0.18 | A | A |

※ dVolume-average particle size of microcapsules

As can be seen in Table 1, the electrophoretic display device manufactured in each of the Examples 1 to 7, that is, all of the electrophoretic display device of the present invention exhibited superior contrast ratio in display as compared to that of the electrophoretic display device manufactured in each of the Comparative Examples 1 to 4.

In the case where the concave portions were provided on the base members (Examples 1 and 2), the contrast ratio in the display was particularly high as compared to a case where the concave portions were not provided on the base members (Examples 3 and 4).

Further, the leak current per unit area generated in the electrophoretic display device manufactured in each of the Examples 1 to 7 was lower than that generated in the electrophoretic display device manufactured in each of the Comparative Examples 1 to 4.

In the electrophoretic display device manufactured in each of the Examples 1 to 7, the properly-sized microcapsules were a side by side relation in a thickness direction of the electrophoretic display device so as to be a monolayer. In addition, the bubbles were not mixed in the first binder layers and the second binder layer.

On the other hand, in the electrophoretic display device manufactured in the Comparative Examples 1 and 2, the microcapsules (properly-sized and the improperly-sized) were overlapped with each other in a thickness direction of the electrophoretic display device. In addition, a large number of the bubbles were mixed in the first binder layers and/or the second binder layer.

What is claimed is:
1. An electrophoretic display device comprising:
a first electrode provided on a surface of a first base member, the surface of the first base member being formed with a plurality of concave portions in which the first electrode is disposed;
second electrodes provided on a surface of a second base member so that the second electrodes are placed in a facing relationship with the first electrode, the surface of the second base member being formed with a plurality of concave portions which respectively correspond to the concave portions of the first base member to form a plurality of pairs of corresponding concave portions, the second electrodes being respectively disposed in the concave portions of the second base member; and
a plurality of microcapsules provided between the first electrode and the second electrodes in a state that each of the plurality of microcapsules is partially received in each of the pairs of the corresponding concave portions of the first and second base members, the plurality of microcapsules each having an internal space filled with an electrophoretic dispersion liquid, and the electrophoretic dispersion liquid containing electrophoretic particles, the plurality of microcapsules being positioned such that spaces are formed between the first electrode and the second electrodes.

2. The electrophoretic display device as claimed in claim 1, an average size of the spaces in a thickness direction of the electrophoretic display device being in the range of 0.2d to 0.8d when a volume-average particle size of the plurality of microcapsules is defined as "d".

3. The electrophoretic display device as claimed in claim 1, a volume-average particle size of the plurality of microcapsules being in the range of 20 to 60 μm.

4. The electrophoretic display device as claimed in claim 1, the plurality of microcapsules being arranged in a monolayer in a side by side relation without overlapping in a thickness direction of the electrophoretic display device.

5. The electrophoretic display device as claimed in claim 1, the depth of each of the concave portions of the first and second base members being in the range of 0.1d to 0.5d when a volume-average particle size of the plurality of the microcapsules is defined as "d".

6. The electrophoretic display device as claimed in claim 1, the concave portions of the first and second base members including adjacent concave portions, a pitch between the adjacent concave portions being set so as to be larger than or equal to a volume-average particle size of the plurality of microcapsules.

7. The electrophoretic display device as claimed in claim 1 further comprising:
a first binder layer formed on the first electrode and a second binder layer formed on the second electrodes, the plurality of microcapsules being fixed onto the first electrode through the first binder layer and onto the second electrodes through the second binder layer, and the first binder layer being provided on the first electrode so as not to be brought into contact with the second binder layer.

8. The electrophoretic display device as claimed in claim 7, each of the first binder layer and the second binder layer having conductive property.

9. The electrophoretic display device as claimed in claim 8, an electric conductivity of each of the first binder layer and the second binder layer being in the range of 20 to 200 μS/cm.

10. The electrophoretic display device as claimed in claim 7, each of the first binder layer and the second binder layer being constituted of an acryl-based resin as a main component thereof.

11. The electrophoretic display device as claimed in claim 1, each of the plurality of microcapsules having a substantially spherical shape.

12. An electronic device provided with the electrophoretic display device defined in claim 1.

13. A method of manufacturing an electrophoretic display device, the method comprising:
preparing a first electrode provided on a first base member, and the first electrode having a surface;
preparing second electrodes provided on a second base member;
forming a first binder layer on the surface of the first electrode;
supplying a plurality of microcapsules onto the first binder layer with a predetermined spacing between adjacent microcapsules, the plurality of microcapsules each having an internal space, the internal space filled with an electrophoretic dispersion liquid, and the electrophoretic dispersion liquid containing electrophoretic particles;
fixing the plurality of microcapsules onto the surface of the first electrode through the first binder layer to obtain an electrophoretic display sheet;
forming a second binder layer on the plurality of microcapsules so as not to be brought into contact with the first binder layer to form spaces between the plurality of the adjacent microcapsules and between the first binder layer and the second binder layer; and
providing the second electrodes provided on the second base member on the second binder layer to obtain the electrophoretic display device.

14. The method as claimed in claim 13, the supplying of the plurality of microcapsules comprising:
dispersing the plurality of microcapsules to a dispersion medium having a volatile property to obtain a microcapsule dispersion liquid;
supplying the microcapsule dispersion liquid onto the first binder layer to obtain a liquid coating film; and
volatilizing and removing the dispersion medium from the liquid coating film to thereby allow the plurality of microcapsules to remain on the first binder layer.

15. The method as claimed in claim 14, a specific gravity of the dispersion medium being lower than a specific gravity of each of the plurality of microcapsules.

16. A method of manufacturing an electrophoretic display device, the method comprising:
preparing a first electrode provided on a first base member, and the first electrode having a surface;
preparing second electrodes provided on a second base member;
forming a first binder layer on the surface of the first electrode;
supplying a plurality of microcapsules onto the first binder layer with a predetermined spacing between adjacent microcapsules, the plurality of microcapsules each having an internal space, the internal space filled with an electrophoretic dispersion liquid, and the electrophoretic dispersion liquid containing electrophoretic particles;
fixing the plurality of microcapsules onto the surface of the first electrode through the first binder layer to obtain an electrophoretic display sheet;
forming a second binder layer preliminarily on the second electrodes provided on the second base member; and
providing the second binder layer formed on the second electrodes on the plurality of microcapsules of the electrophoretic display sheet so as to allow the second binder layer to adhere to the plurality of microcapsules so that spaces are formed between the plurality of the adjacent microcapsules and between the first binder layer and the second binder layer to obtain the electrophoretic display device.

17. The method as claimed in claim 16, the second base member having a surface on which the second electrodes are formed and a plurality of concave portions are provided, and the second electrodes being formed on the surface of the second base member so that the second electrodes are respectively disposed in the concave portions of the second base member, the second binder layer being formed on the second electrodes so as to be in contact with the second electrodes disposed in the concave portions of the second base member.

18. The method as claimed in claim 17, the first binder layer including sub-first binder layers, the sub-first binder layers being formed only in concave portions of the first base member.

19. The method as claimed in claim 16, before the forming of the second binder layer and after the fixing of the plurality of microcapsules, the method further comprises tilting the electrophoretic display sheet.

* * * * *

UNITED STATES PATENT AND TRADEMARK OFFICE
CERTIFICATE OF CORRECTION

PATENT NO. : 7,999,997 B2
APPLICATION NO. : 12/379304
DATED : August 16, 2011
INVENTOR(S) : Harunobu Komatsu et al.

It is certified that error appears in the above-identified patent and that said Letters Patent is hereby corrected as shown below:

On the Title Page

Please amend the third inventor name as follows:

Item (75), please change "Akira Masumoto" to --Akira Matsumoto--.

Signed and Sealed this
Tenth Day of January, 2012

David J. Kappos
*Director of the United States Patent and Trademark Office*